(12) United States Patent
Shimanaka et al.

(10) Patent No.: US 9,120,948 B2
(45) Date of Patent: Sep. 1, 2015

(54) PROCESS FOR PRODUCING BLOCK POLYMER, COATED PIGMENT AND AQUEOUS PIGMENT DISPERSION

(71) Applicants: Dainichiseika Color & Chemicals Mfg. Co., Ltd., Chuo-ku, Tokyo (JP); Kyoto University, Kyoto-shi, Kyoto (JP)

(72) Inventors: Hiroyuki Shimanaka, Tokyo (JP); Taiyo Aoyagi, Tokyo (JP); Yoshikazu Murakami, Tokyo (JP); Sachio Yoshikawa, Tokyo (JP); Naoyuki Sakai, Tokyo (JP); Atsushi Goto, Uji (JP); Yoshinobu Tsujii, Uji (JP); Takeshi Fukuda, Uji (JP)

(73) Assignees: DAINICHISEIKA COLOR & CHEMICALS MFG. CO., LTD., Tokyo (JP); KYOTO UNIVERSITY, Kyoto (JP)

( * ) Notice: Subject to any disclaimer, the term of this patent is extended or adjusted under 35 U.S.C. 154(b) by 140 days.

(21) Appl. No.: 13/799,921

(22) Filed: Mar. 13, 2013

(65) Prior Publication Data

US 2013/0196064 A1    Aug. 1, 2013

Related U.S. Application Data

(62) Division of application No. 12/737,568, filed as application No. PCT/JP2009/063265 on Jul. 24, 2009, now abandoned.

(30) Foreign Application Priority Data

Jul. 28, 2008    (JP) ................................ 2008-193896

(51) Int. Cl.
*C09D 153/00* (2006.01)
*C08F 293/00* (2006.01)
(Continued)

(52) U.S. Cl.
CPC .......... *C09D 153/00* (2013.01); *C08F 293/005* (2013.01); *C08L 53/00* (2013.01);
(Continued)

(58) Field of Classification Search
None
See application file for complete search history.

(56) References Cited

U.S. PATENT DOCUMENTS

| 4,279,720 A | 7/1981 | Berner |
| 5,085,698 A | 2/1992 | Ma et al. |

(Continued)

FOREIGN PATENT DOCUMENTS

| EP | 0 518 225 A1 | 12/1992 |
| EP | 2 147 936 A1 | 1/2010 |

(Continued)

OTHER PUBLICATIONS

Certified priority Document JP 2008-193896, Jul. 2009.*

(Continued)

*Primary Examiner* — Satya Sastri
(74) *Attorney, Agent, or Firm* — Hamre, Schumann, Mueller & Larson, P.C.

(57) ABSTRACT

Disclosed are an aqueous pigment dispersion containing at least a pigment, water, a high-molecular dispersant, and an alkali. The high-molecular dispersant is a diblock polymer having a formula (1) of A-B or a triblock polymer having a formula (2) of A-B-C. The diblock or triblock polymer is a diblock or triblock polymer obtained by polymerizing addition-polymerizable monomers with a radical generator while using an organic iodide as a polymerization initiating compound and an organic phosphorus compound, organic nitrogen compound or organic oxygen compound as a catalyst. Also disclosed are a production method and use of the aqueous pigment dispersion. With the high-molecular dispersant obtained by a simple living radical polymerization process free of the problems of conventional living radical polymerization and having a precisely-controlled molecular structure, the aqueous pigment dispersion can be obtained with the pigment dispersed in it.

7 Claims, 2 Drawing Sheets

Example

Comparative Example 2

(51) Int. Cl.

| | | |
|---|---|---|
| *C08L 53/00* | (2006.01) | |
| *C09B 67/20* | (2006.01) | |
| *C09B 67/46* | (2006.01) | |
| *C09D 7/12* | (2006.01) | |
| *C09D 11/326* | (2014.01) | |
| *C09D 17/00* | (2006.01) | |
| *C08K 9/08* | (2006.01) | |

(52) U.S. Cl.
CPC .......... *C09B 67/009* (2013.01); *C09B 67/0066* (2013.01); *C09D 7/1225* (2013.01); *C09D 11/326* (2013.01); *C09D 17/001* (2013.01); *C08F 2438/00* (2013.01); *C08K 9/08* (2013.01)

(56) References Cited

U.S. PATENT DOCUMENTS

| | | | |
|---|---|---|---|
| 5,221,334 A * | 6/1993 | Ma et al. ................. | 524/167 |
| 5,272,201 A | 12/1993 | Ma et al. | |
| 5,324,798 A | 6/1994 | Sanders et al. | |
| 5,328,970 A | 7/1994 | Inoue et al. | |
| 6,242,546 B1 * | 6/2001 | Nakai et al. ............ | 526/211 |
| 6,306,995 B1 * | 10/2001 | Wang ..................... | 526/348 |
| 7,399,814 B2 * | 7/2008 | Goto et al. .............. | 526/221 |
| 2004/0143035 A1 | 7/2004 | Goebelt et al. | |
| 2009/0018270 A1 * | 1/2009 | Crooks et al. ........... | 525/89 |
| 2010/0298499 A1 * | 11/2010 | Goto et al. .............. | 525/192 |
| 2011/0040025 A1 * | 2/2011 | Deroo et al. ............. | 524/548 |

FOREIGN PATENT DOCUMENTS

| | | | |
|---|---|---|---|
| JP | 47-13366 | | 4/1972 |
| JP | 55-23186 | A | 2/1980 |
| JP | 2-103274 | A | 4/1990 |
| JP | 4-227668 | A | 9/1992 |
| JP | 4-275304 | A | 9/1992 |
| JP | 4-323204 | A | 11/1992 |
| JP | 5-179183 | A | 7/1993 |
| JP | 6-234808 | A | 8/1994 |
| JP | 7-126322 | A | 5/1995 |
| JP | 7-278481 | A | 10/1995 |
| JP | 11-147914 | A | 6/1999 |
| JP | 2000-500516 | A | 1/2000 |
| JP | 2000-198810 | A | 7/2000 |
| JP | 2000-514479 | A | 10/2000 |
| JP | 2000-515181 | A | 11/2000 |
| JP | 2001-98008 | A | 4/2001 |
| JP | 2002-534542 | A | 10/2002 |
| JP | 2003-137917 | A | 5/2003 |
| JP | 2004-66235 | A | 3/2004 |
| JP | 2004-307872 | A | 11/2004 |
| JP | 2006-524215 | A | 10/2006 |
| JP | 2007-505179 | A | 3/2007 |
| JP | 2007-92014 | A | 4/2007 |
| JP | 2007-277533 | A | 10/2007 |
| JP | 2008-505999 | A | 2/2008 |
| JP | 2008-56786 | | 3/2008 |
| WO | 97/18247 | A1 | 5/1997 |
| WO | 98/01478 | A1 | 1/1998 |
| WO | 98/01480 | A1 | 1/1998 |
| WO | 99/05099 | A1 | 2/1999 |
| WO | 00/40630 | A1 | 7/2000 |
| WO | 01/44376 | A1 | 6/2001 |
| WO | 2004/094356 | A1 | 11/2004 |
| WO | 2005/023878 | A1 | 3/2005 |
| WO | 2006/003352 | A1 | 1/2006 |
| WO | 2006/080928 | A1 | 8/2006 |
| WO | 2007/140440 | A2 | 12/2007 |

OTHER PUBLICATIONS

Japan Patent Office, Office Action for Japan Patent Application No. 2008-193896, Sep. 2, 2014, Tokyo, Japan.

Japan Patent Office, Office Action for Japan Patent Application No. 2008-193896, Mar. 12, 2013, Tokyo, Japan.

Japan Patent Office, Office Action for Japan Patent Application No. 2008-193896, Dec. 17, 2013, Tokyo, Japan.

Vara Prasad, D., et al., "Effects of Phosphorous-Oxychloride, Phosphorous Trichloride and Dichlorophenylphosphine on the Radical Polymerisation of Acrylonitrile Under Heterogeneous Conditions," Polymer Bulletin, vol. 2, 1980, pp. 117-123.

Hawker, C., et al., "New Polymer Synthesis by Nitroxide Mediated Living Radical Polymerizations," Chemical Review, vol. 101, No. 12, 2001, pp. 3661-3688.

Kamigaito, M., et al., "Metal-Catalyzed Living Radical Polymerization," Chemical Review, vol. 101, No. 12, 2001, pp. 3689-3745.

Yamago, S., et al., "Organotellurium Compounds as Novel Initiators for Controlled/Living Radical Polymerizations," Journal of the American Chemical Society, vol. 124, No. 12, 2002, pp. 2874-2875.

Yamago, S., et al., Tailored Synthesis of Structurally Defined Polymers by Organotellurium-Mediated Living Radical Polymerization (TERP), Journal of the American Chemical Society, vol. 124, No. 46, 2002, pp. 13666-13667. X.

Goto, A., et al., "Mechanism-Based Invention of High-Speed Living Radical Polymerization Using Organotellurium Compounds and Azo-Initiators," Journal of the American Chemical Society, vol. 125, No. 29, 2003, pp. 8720-8721.

European Patent Office, Extended European Search Report for European Patent Application No. EP 09 80 2894, Nov. 28, 2011, European Patent Office, Munich, Germany.

* cited by examiner

Example

Comparative Example 2

Example

Comparative Example 2

Example

Comparative Example 2

PROCESS FOR PRODUCING BLOCK POLYMER, COATED PIGMENT AND AQUEOUS PIGMENT DISPERSION

This application is a divisional of prior application Ser. No. 12/737,568, filed Jan. 26, 2011, which is the U.S. National Stage of App. No. PCT/JP2009/063265 filed Jul. 24, 2009. Priority is claimed from Japan Patent App. No. 2008-193896 filed Jul. 28, 2008. The contents of said application Ser. No. 12/737,568, filed Jan. 26, 2011, App. No. PCT/JP2009/063265 filed Jul. 24, 2009, and Japan Patent App. No. 2008-193896 filed Jul. 28, 2008, are hereby incorporated by reference herein, in their entirety. This invention relates to an aqueous pigment dispersion, which contains a pigment highly microdispersed therein, has good storage stability and gives printed images and characters of good quality. This invention is also concerned with a treated pigment, paint, ink, coating formulation, toner, stationery, and the like.

TECHNICAL FIELD

Background Art

Keeping in step with the move toward colored products of higher performance, there has also been a conventional requirement in the market for high performance in the field of colorants (pigments and coloring agents), resulting in an outstanding demand for a novel pigment dispersion that has high color-developing ability and can afford a colored product having vividness, high durability and high transparency. With respect to pigment dispersants, on the other hand, there is also an outstanding demand for those excellent in various properties such as pigment dispersibility of dispersed pigment particles, the storage stability and high transparency. Especially for pigment dispersions, there is nowadays a tendency toward microparticulated pigments in view of a requirement for improvements in the transparency of colored products. When a pigment is formed into microparticles, however, it is provided with higher surface energy, leading to a tendency that agglomeration of pigment particles takes place and the pigment dispersion is provided with lower storage stability and higher viscosity. There is, accordingly, an outstanding demand for a high-molecular dispersant having further improved pigment dispersibility and a pigment dispersion prepared with the high-molecular dispersant.

As a polymerization process that can control a polymer structure upon synthesis of a high-molecular dispersant by radical polymerization that makes use of an addition-polymerizable monomer, living radical polymerization has been invented. This living radical polymerization process is a novel and precise polymerization process that initiates polymerization from the initiating compound. In general, its end radical is stabilized with a stable group, the stable end group is caused to dissociate under the action of heat or a catalyst to form a polymer having a radical end. In the state of this momentary dissociation, the monomer undergoes a polymerization reaction so that the stable group is immediately bonded to stabilize the radical end. This process prevents a bimolecular termination reaction or disproportionation reaction as a side reaction of radical polymerization and does not deactivate the radical as a reactive end, in other words, is a "living" radical polymerization process.

In this living radical polymerization, the polymerization proceeds as time goes on, and based on the amount of polymerization initiating compound at the initiation of the reaction, the molecular weight of a resulting polymer is determined, and the molecular weight distribution of the resulting polymer can be controlled very narrow (molecular weight distribution, PDI: to 1.3). Upon addition and polymerization of a next monomer after the completion of the polymerization, the polymerization is initiated to enable block polymerization to afford a block copolymer although such block copolymerization can be hardly conducted by the conventional radical polymerization. The selection of an appropriate initiating compound makes it possible to obtain polymers of various higher structures, such as graft copolymers and star polymers.

Developed as specific examples of the above-described living radical polymerization process include the nitroxide mediated polymerization (NMP) process that makes use of dissociation and bonding of amine oxide radicals (Non-patent Document 1), the atom transfer radical polymerization (ATRP) process that conducts polymerization in the presence of a halogen compound as an initiating compound by using a heavy metal such as copper, ruthenium, nickel or iron and a ligand capable of forming a complex with the heavy metal (Patent Document 1, Patent Document 2, and Non-patent Document 2), the reversible addition-fragmentation transfer (RAFT) process that conducts polymerization by using an addition-polymerizable monomer and a polymerization initiator in the presence of a dithiocarboxylate ester, a xanthate compound or the like as an initiating compound (Patent Document 3), the macromolecular design via interchange of xanthate (MADIX) process (Patent Document 4), the degenerative transfer (DT) process that makes use of a heavy metal such as an organotellurium compound, organobismuth compound, organoantimony compound, antimony halide, organogermanium compound or germanium halide (Patent Document 5 and Non-patent Document 3), and so on. Extensive research and development work is underway on the living radical polymerization process.

A high-molecular dispersant, which is obtained by polymerizing addition-polymerizable monomers such as styrene and a (meth)acrylic monomer and has conventionally been used to disperse a pigment in a pigment dispersion, is a random copolymer making use of the addition-polymerizable monomers. To obtain a still finer microdispersion of a pigment, a block polymer was developed. This block copolymer can be obtained by polymerizing addition-polymerizable monomers in accordance with a conventionally-known anionic polymerization or cationic polymerization, and is controlled in structure. This anionic polymerization or cationic polymerization, however, requires strict polymerization conditions, so that a study was conducted based on simple radical polymerization. By the above-described living radical polymerization, it was possible to obtain a block polymer the structure of which was known. The use of the block polymer as a high-molecular dispersant has been studied (Patent Document 6).

PRIOR ART DOCUMENTS

Patent Documents

Patent Document 1: JP-A-2000-500516
Patent Document 2: JP-A-2000-514479
Patent Document 3: JP-A-2000-515181
Patent Document 4: WO 1999/05099
Patent Document 5: JP-A-2007-277533
Patent Document 6: JP-A-2004-66235

Non-Patent Documents

Non-patent Document 1: Chemical Review (2001) 101, p 3661

Non-patent Document 2: Chemical Review (2001) 101, p 3689

Non-patent Document 3: Journal of American Chemical Society (2002) 124 p 2874, ibid. (2002) 124 p 13666, ibid. (2003) 125 p 8720.

DISCLOSURE OF THE INVENTION

Problem to be Solved by the Invention

However, the high-molecular dispersant obtained by the living radical polymerization is accompanied by the following problems resulted from the living radical polymerization. In the NMP process, for example, tetramethylpiperidine oxide radicals are used as a polymerization initiator. In the polymerization that makes use of tetramethylpiperidine oxide radicals, however, an elevated temperature of 100° C. or higher is needed. To achieve a higher polymerization degree, a monomer needs to be singly subjected to polymerization without using any polymerization solvent, thereby requiring stricter polymerization conditions.

Further, with this process, the polymerization of a methacrylate monomer hardly proceeds in general. To lower the polymerization temperature or to polymerize the methacrylate monomer in this polymerization process, a special nitroxide compound is needed. As the special nitroxide compound is expensive, the resulting polymer becomes costly.

In the ATRP process, the use of a heavy metal is needed for polymerization, and therefore, the heavy metal is contained in the resulting polymer. Accordingly, it is necessary to remove the heavy metal from the polymer. When the polymer is purified, effluent water and/or waste solvent occurred as a result of the purification contains the heavy metal that places a high load on the environment, and therefore, the removal of the heavy metal from the effluent water and/or waste solvent is needed. In the ATRP process that makes use of copper, on the other hand, oxygen needs to be eliminated from the polymerization atmosphere. If oxygen is contained, cuprous copper is oxidized into cupric copper so that the catalyst is deactivated. If the catalyst is oxidized, there is a method that adds a stannic compound, ascorbic acid or the like as a reducing agent to convert the copper back into the original monovalent copper. Even with this method, there is a potential problem that the polymerization may terminate halfway. It is, therefore, essential to fully eliminate oxygen from the polymerization atmosphere.

In the process that conducts polymerization by forming a complex while using an amine compound as a ligand, the existence of an acid inhibits the formation of the complex so that an addition-polymerizable monomer containing an acid group can be hardly polymerized. When there is a need to introduce acid groups into the polymer obtained by the above-described method, it is necessary to polymerize the monomer with its acid group being protected, and after the polymerization, to deprotect each monomer unit to regenerate the acid group. With this process, it is hence not easy to introduce acid groups into the resulting polymer.

Further, the RAFT process or MADIX process requires to synthesize a special compound such as a dithiocarboxylate ester or xanthate compound, and therefore, is costly. As this process uses the sulfur-containing compound, an unpleasant sulfur smell remains in the resulting polymer. In addition, the polymer is colored. It is, therefore, necessary to eliminate these smell and color from the polymer.

The DT process makes use of a heavy metal like the ATRP process, and the heavy metal needs to be eliminated from the resulting polymer. Similar to the foregoing, there is, accordingly, a problem of effluent water when the heavy metal is eliminated. Moreover, the synthesis of an organometal compound for use in the process is irksome, and requires high cost.

An object of the present invention is, therefore, to provide an aqueous pigment dispersion with a pigment dispersed therein by a high-molecular dispersant, which is free of such problems as described above, has been obtained by a simple living radical polymerization process, is precisely controlled in molecular structure.

Means for Solving the Problem

The above-described object can be achieved by the present invention to be described hereinafter. Described specifically, the present invention provides an aqueous pigment dispersion comprising at least a pigment, water, a high-molecular dispersant, and an alkali, wherein the high-molecular dispersant is a diblock polymer having a formula (1) of A-B or a triblock polymer having a formula (2) of A-B-C, and the diblock or triblock polymer is a diblock or triblock polymer obtained by polymerizing addition-polymerizable monomers with a radical generator while using an organic iodide as a polymerization initiating compound and an organic phosphorus compound, organic nitrogen compound or organic oxygen compound as a catalyst; and in the formulas (1) and (2), A, B and C each represent a polymer block of at least one of the addition-polymerizable monomers, the A and C blocks may be the same or different, the A and C blocks are each a polymer block which is formed from at least one monomer having an acid group and has an acid value of from 40 to 300 mgKOH/g, and the B block is a polymer block of a hydrophobic monomer.

In the present invention as described above, it is preferred that the organic phosphorus compound is an iodine-containing phosphorus halide, phosphite compound or phosphinate compound, the organic nitrogen compound is an imide compound or hydantoin compound, and the organic oxygen compound is a phenolic compound, iodoxyphenyl compound or vitamin; and that the diblock or triblock polymer has an overall acid value of from 20 to 250 mgKOH/g, and a content of the A block or a total content of the A and C blocks in the diblock or triblock polymer amounts to at least 20 wt % of the entire diblock or triblock polymer.

In the present invention as descibed above, it is also preferred that the diblock or triblock polymer has a number average molecular weight of from 1,000 to 20,000, and the B block in the diblock or triblock polymer has a number average molecular weight of not greater than 80% of the overall number average molecular weight of the corresponding block polymer; and that the monomer having the acid group is (meth)acrylic acid, and the hydrophobic monomer comprises benzyl(meth)acrylate or cyclohexyl(meth)acrylate.

Further, the present invention provides a process for treating a pigment by mixing at least the pigment, water, an organic solvent, an alkali and a high-molecular dispersant to disperse the pigment in the water and then adding an acid to the resulting liquid mixture such that the high-molecular dispersant dissolved in the liquid mixture is caused to precipitate to coat the pigment with the high-molecular dispersant or by kneading at least the pigment and the high-molecular dispersant and then adding the resulting kneaded mixture to a poor solvent for the high-molecular dispersant such that the pigment is coated with the high-molecular dispersant, wherein the high-molecular dispersant is the diblock polymer having the formula (1) of A-B or the triblock polymer having the formula (2) of A-B-C; and also a treated pigment obtained by the process and having a pigment content of from 20 to 95 wt %.

Furthermore, the present invention also provides a method for producing an aqueous pigment dispersion, which comprises dispersing the treated pigment in an alkaline aqueous medium; and also a paint, ink, coating formulation, toner or stationery comprising the aqueous pigment dispersion.

Advantageous Effects of the Invention

The high-molecular dispersant for use in the present invention has a diblock or triblock structure formed of one or two water-soluble polymer blocks and a water-insoluble polymer block. By treating a pigment with the block polymer, the water-insoluble polymer block or blocks coat pigment particles or deposit on pigment particles. Even in an aqueous medium, the high-molecular dispersant is not dissolved and remains coating the pigment to form a pigment-resin capsule structure. On the other hand, the water-soluble polymer block or blocks have hydrophilicity, thereby dispersing the encapsulated pigment in the aqueous medium and providing the pigment with high dispersion stability and high microdispersibility. Even if the dispersion dries up, the hydrophilic polymer block is readily dissolved in water. By simply bringing a dried product into contact with water, the pigment is hence allowed to readily disperse in water. The use of the aqueous pigment dispersion according to the present invention for the coloration of a product or article can afford a colored product or article having high vividness, a highly-developed color and a high gloss.

The process that obtains the high-molecular dispersant for use in the present invention is a novel living radical polymerization process, which is neither the conventional radical polymerization nor the above-described living radical polymerization process and is free of the problem of the heavy metal, smell, coloration, cost and the like in the above-described living, radical polymerization. The aqueous pigment dispersion according to the present invention is an aqueous pigment dispersion which can be obtained by treating a pigment with the above-described high-molecular dispersant and then dispersing the thus-treated pigment, and the aqueous pigment dispersion is very useful as a coloring agent for a water-based paint, gravure ink, stationery color, water-based inkjet ink, wet toner, chemical toner, water-based coating formulation, and the like.

The process that obtains the high-molecular dispersant for use in the present invention has the following merits:
(1) No heavy metal compound is used; unlike the ATRP processor DT process, no heavy metal compound is used.
(2) Purification is not essential; the ATRP process and DT process need the removal of a heavy metal, and the RAFT process and MADIX process need the removal of a sulfur compound.
(3) No special and expensive compound is needed, a relatively economical material available on the market can be used, and therefore, the process is economical; the other living radical polymerization processes each require a special compound.
(4) Polymerization conditions are mild, and the polymerization can be conducted under similar conditions as the conventional radical polymerization processes; an elevated temperature is needed for the NMP process, while the elimination of oxygen is needed for the ATRP process.
(5) No purification is needed for the monomers, solvent and the like, which are to be used, a variety of monomers can be used, monomers containing various functional groups such as acid groups and amino group can be used, and therefore, various functional groups can be introduced into polymer blocks; especially in the ATRP process, an acid group acts as a catalyst poison for the process, and by the NMP process, no methacrylate can be polymerized well.
(6) The molecular weight and structure can be controlled, the block polymer can be easily obtained in a desired linkage form, and the polymerization degree is very high.

MODES FOR CARRYING OUT THE INVENTION

Figure 1:
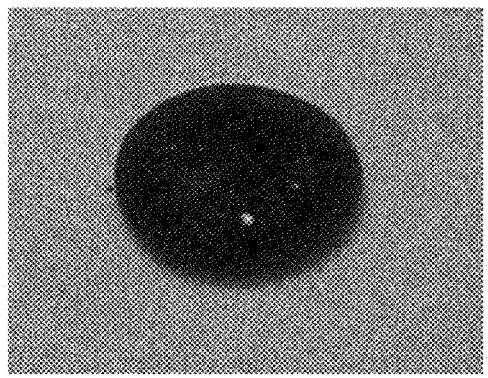
FIG. 1 shows dried films (left—Example, right—Comparative Example 2).
Figure 1:
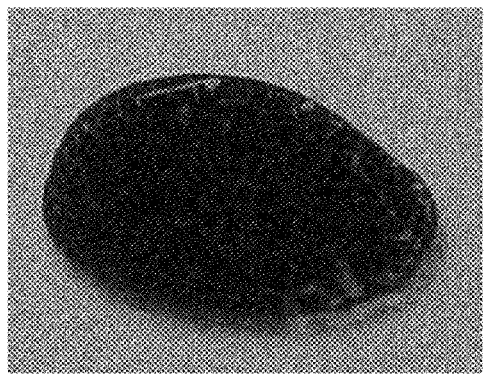

The present invention will hereinafter be described in further detail based on preferred embodiments.

First, no particular limitation is imposed on the pigment for use in the present invention, and conventionally-known organic pigments and inorganic pigments can each be used. For example, organic pigments include phthalocyanine, azo, azomethineazo, azomethine, anthraquinone, perinone and perylene, indigo and thioindigo, dioxazine, quinacridone, isoindoline, isoindolinone, diketopyrrolopyrrole, quinophthalone, and indathrene pigments, carbon black pigment, and the like. On the other hand, inorganic pigments include extender pigments, titanium oxide pigments, iron oxide pigments, spinel pigments, and the like.

Further, conventionally-known pigment derivatives (synergists) may each be used in combination with the pigment in a similar manner as in the conventionally-known process. Such synergists include sulfonated derivative, aminated derivatives and the like of azo and phthalocyanine pigments. Depending on the purpose, selection may desirably be made as to the kind and particle size of the pigment and the manner of treatment. A microparticulated pigment is desired except where hiding power is needed for an article or produced to be colored. Especially when transparency is desired, it is desired to eliminate particles of an organic pigment, said particles having particle sizes greater than 0.5 μm, such that the average particle size is controlled to 0.15 μm or smaller.

A description will next be made about the high-molecular dispersant to be used in the present invention. The high-molecular dispersant for use in the present invention is a diblock polymer having a formula (1) of A-B or a triblock polymer having a formula (2) of A-B-C. In the formulas (1) and (2), A, B and C each represent a polymer block of at least one addition-polymerizable monomer, the A and C blocks may be the same or different, the A and C blocks are each a polymer block which is formed from at least one monomer having an acid group and has an acid value of from 40 to 300 mgKOH/g, and the B block is a polymer block of a hydrophobic monomer.

The diblock or triblock polymer may preferably have an overall acid value of from 20 to 250 mgKOH/g, and the content of A block or the total content of A and C blocks may preferably amount to at least 20 wt % of the entire high-molecular dispersant (diblock or triblock polymer). More preferably, the high-molecular dispersant may have a number average molecular weight of from 1,000 to 20,000, and the B block in the high-molecular dispersant may have a total number average molecular weight of not greater than 80% of the overall number average molecular weight of the corresponding block polymer.

The high-molecular dispersant for use in the present invention is the block polymer formed of the A block and B block or the A block, B block and C block. The A block or the A block and C block are each a polymer block of a monomer having an acid group. By neutralizing such acid groups, the block polymers are rendered soluble in water. The B block is a polymer block formed primarily from a water-insoluble hydrophobic monomer, although the B block may have acid groups. Therefore, the high-molecular dispersant for use in the present invention is an amphiphilic block polymer.

When the pigment is dispersed in an aqueous medium by using the high-molecular dispersant which is useful in the present invention, B block is insoluble in water, and therefore, is adsorbed on particles of the pigment or are allowed to deposit on the particles of the pigment. The pigment is, therefore, brought into a form that it is encapsulated with the B block. The A block or the A and C blocks are neutralized and ionized with the alkali in the aqueous medium, and therefore, are allowed to dissolve in water. Owing to these behaviors, the high-molecular dispersant disperses the pigment in the form of microparticles in the aqueous medium, and provides the resulting aqueous pigment dispersion with improved dispersion stability and storage stability.

The encapsulation of the pigment with the high-molecular dispersant makes it possible to reduce the penetration of the pigment into paper and to increase the color development of the pigment when characters or images are printed on the paper with an aqueous pigment dispersion (for example, an ink). When the aqueous pigment dispersion is applied to a film or an article, the A block or C block acts as a binder component for the pigment to form coatings, and moreover, shows compatibility with another binder component so that the coatings present a good external appearance. Further, when the pigment dispersion according to the present invention is used as a water-based inkjet ink, the ejection stability is good and no nozzle clogging takes place.

In the high-molecular dispersant for use in the present invention, the A block and the C block may be the same or different, and these blocks are each a polymer block polymerized from a monomer, which contains an acid group, as at least one component. By neutralizing such acid groups with the alkali, the A block or the A and C blocks are rendered soluble in water.

As the acid group of such a monomer, a conventionally-known, carboxyl, sulfonic or phosphoric group can be mentioned, with a carboxyl group being particularly preferred. Because, in the present invention, the high-molecular dispersant is rendered insoluble to precipitate with an acid after the pigment is dispersed with the high-molecular dispersant, and this precipitation is facilitated when the acid group is a carboxyl group.

As monomers having an acid group, those known to date can be mentioned. Illustrative carboxyl-containing monomers include acrylic acid, acrylic acid dimer, methacrylic acid, maleic acid, itaconic acid, fumaric acid, crotonic acid, and monomers obtained by reacting maleic anhydride, succinic anhydride or phthalic anhydride with hydroxyalkyl (meth)acrylates such as 2-hydroxyethyl(meth)acrylate and 4-hydroxybutyl(meth)acrylate. Illustrative sulfonic-containing monomers include styrenesulfonic acid, dimethylpropylsulfonic acid(meth)acrylamide, ethylsulfonate(meth)acrylate, ethylsulfonate(meth)acrylamide, vinyl sulfonic acid, and the like. Illustrative phosphoric-containing monomers include methacryloyloxyethyl phosphates.

The above-exemplified carboxyl-containing monomers are particularly preferred in the present invention. More preferred is acrylic acid or methacrylic acid, because this monomer is low in molecular weight so that its proportion can be increased in a monomer composition to be polymerized and the resulting high-molecular dispersant can hence be provided with a higher acid value. Moreover, these monomers are also high in polymerization degree in the polymerization process to be employed in the present invention.

The polymerization process for use in the present invention is significantly characterized in that each monomer having an acid group can be used as it is. If necessary, however, the acid group may be protected, and after obtaining a block polymer, the protecting group for each acid group is removed to regenerate the acid group. A conventionally-known monomer can be used in this process. After polymerization, each unit of, for example, a hemiacetal(meth)acrylate such as methyl(meth)acrylate, t-butyl(meth)acrylate, benzyl(meth)acrylate or 1-n-propoxyethyl(meth)acrylate can be deprotected into a unit of (meth)acrylic acid.

For the dissolution of the A block and C block of the high-molecular dispersant in water, the contents of acid groups in these blocks, in other words, the acid values of these blocks are important. The acid values are from 40 to 300 mgKOH/g, preferably from 60 to 250 mgKOH/g. If these acid values are lower than 40 mgKOH/g, the high-molecular dispersant for use in the present invention is not soluble in water. If these acid values exceed 300 mgKOH/g, on the other hand, the acid values are so high that, when the aqueous pigment dispersion is used for the coloration of an article, the resulting color coating is provided with reduced waterproofness. Moreover, the A block or the A and C blocks affect even the B block in the high-molecular dispersant so that, even when a pigment is coated with the high-molecular dispersant, the B block may separate from the pigment due to the high water solubility of the high-molecular dispersant and capsules may hence be destructed.

In addition to the acid-group-containing monomer or monomers, a further copolymerizable monomer may also be used. Depending on the monomer to be copolymerized, other properties can be imparted including, for example, an adjustment to the acid value for the dissolution in water, adhesiveness to a surface to be coated, compatibility with a binder when mixed with a paint or the like, thermal stability and softness/hardness property to the A block or the A and C blocks, and the like.

As the copolymerizable monomer, a conventionally-known monomer can be mentioned. Examples include vinyl monomers such as styrene, vinyltoluene, vinylhydroxybenzene, chloromethylstyrene, vinylnaphthalene, vinylbiphenyl, vinylethylbenzene, vinyldimethylbenzene, α-methylstyrene, ethylene, propylene, isoprene, butene, butadiene, 1-hexene, cyclohexene, cyclodecene, dichloroethylene, chloroethylene, fluoroethylene, tetrafluoroethylene, acrylonitrile, methacrylonitrile, vinyl acetate, vinyl propionate, isocyanatodimethylmethane isopropenyl benzene, phenylmaleimide, cyclohexylmaleimide, and hydroxymethylstyrene;

aliphatic, alicyclic and aromatic alkyl(meth)acrylates such as methyl(meth)acrylate, ethyl(meth)acrylate, propyl(meth)acrylate, isopropyl(meth)acrylate, butyl(meth)acrylate, 2-methylpropane(meth)acrylate, t-butyl(meth)acrylate, pentyl(meth)acrylate, hexyl(meth)acrylate, octyl(meth)acrylate, 2-ethylhexyl(meth)acrylate, nonyl(meth)acrylate, decyl(meth)acrylate, isodecyl(meth)acrylate, lauryl(meth)acrylate, tetradecyl(meth)acrylate, octadecyl(meth)acrylate, behenyl(meth)acrylate, isostearyl(meth)acrylate, cyclohexyl(meth)acrylate, t-butylcyclohexylmethyl(meth)acrylate, isoboronyl(meth)acrylate, 2,2,4-trimethylcyclohexyl (meth)acrylate, cyclodecyl(meth)acrylate, cyclodecylmethyl (meth)acrylate, benzyl(meth)acrylate, t-butylbenzotriazole-phenylethyl(meth)acrylate, phenyl(meth)acrylate, naphthyl (meth)acrylate, and allyl(meth)acrylate;

as monomers containing one or more hydroxyl groups, alkylene glycol mono(meth)acrylates such as 2-hydroxyethyl (meth)acrylate, 2-hydroxypropyl(meth)acrylate, 3-hydroxypropyl(meth)acrylate, 4-hydroxybutyl(meth)acrylate, 6-hydroxyhexyl(meth)acrylate, cyclohexanedimethanol mono (meth)acrylate, and cyclohexanediol mono(meth)acrylate;

as monomers having a polyglycol group, polyalkylene glycol mono(meth)acrylates such as poly(n≥2)ethylene glycol mono(meth)acrylate, poly(n≥2)propylene glycol mono (meth)acrylate, poly(n≥2)tetramethylene glycol mono(meth) acrylate, the mono(meth)acrylate of a mono- or poly(n≥2) ethylene glycol-mono- or poly(n≥2)propylene glycol random copolymer, and the mono(meth)acrylate of a mono- or poly (n≥2)ethylene glycol-mono- or poly(n≥2)propylene glycol block copolymer; further, the mono(meth)acrylates of (poly-alkylene) glycol monoalkyl, alkylene and alkyne ethers or esters, such as (poly)ethylene glycol monomethyl ether (meth)acrylate, (poly)ethylene glycol monooctyl ether(meth) acrylate, (poly)ethylene glycol monolauryl ether(meth)acrylate, (poly)ethylene glycol monostearyl ether(meth)acrylate, (poly)ethylene glycol monooleyl ether(meth)acrylate, (poly)ethylene glycol monostearate ester(meth)acrylate, (poly)ethylene glycol monononylphenyl ether(meth)acrylate, (poly)propylene glycol monomethyl ether(meth)acrylate, (poly) propylene glycol monoethyl ether(meth)acrylate, (poly) propylene glycol monooctyl ether(meth)acrylate, (poly) propylene glycol monolauryl ether(meth)acrylate, and (poly)ethylene glycol (poly)propylene glycol monomethyl ether(meth)acrylate.

Next, among monomers having an amino group, monomers with a primary amino group contained therein include vinylamine, allylamine, aminostyrene, 2-aminoethyl(meth) acrylate, 2-aminopropyl(meth)acrylamide, and the like, and monomers with a secondary amino group contained therein include vinylmethylamine, allylmethylamine, methylaminostyrene, t-butylaminoethyl(meth)acrylate, tetramethylpiperidyl(meth)acrylate, t-butylaminopropyl(meth)acrylamide, and the like;

Monomers with a tertiary amino group contained therein include dimethylaminoethyl(meth)acrylate, diethylaminoethyl(meth)acrylate, pentamethylpiperidyl(meth)acrylate, N-ethylmorpholine(meth)acrylate, dimethylpropyl(meth) acrylamide, vinylpyridine, vinylimidazole, vinylbenzotriazole, vinylcarbazole, dimethylaminostyrene, diallylmethylamine, and the like.

Monomers with a quaternary amino group contained therein include trimethyl ammonium styrene chloride, dimethyl lauryl aminostyrene chloride, vinyl methyl pyridinyl iodide, chlorotrimethylaminoethyl(meth)acrylate, chlorodiethylmethylaminoethyl(meth)acrylate, chlorobenzyldimethylaminoethyl(meth)acrylate, trimethylaminoethyl(meth) acrylate methyl sulfate, diallyldimethylammonium chloride, and the like. Further included are those which can be obtained by reacting primary or secondary amines with glycidyl-containing monomers such as glycidyl(meth)acrylate.

Oxygen-containing monomers include tetrahydrofurfuryl (meth)acrylate, morpholine(meth)acrylate, methylmorpholine(meth)acrylate, methylmorpholinoethyl(meth)acrylate, and the like. Nitrogen-containing monomers include (meth) acryloyloxyethyl isocyanate, (meth)acryloyloxyethoxyethyl isocyanate, blocked isocyanate-containing (meth)acrylates obtained by blocking these isocyanates with caprolactone or the like; and amide monomers such as (meth)acrylamide, N,N-dimethyl(meth)acrylamide, N,N-diethyl(meth)acrylamide, N-methylol(meth)acrylamide and N-butoxymethyl (meth)acrylamide.

In addition, other monomers include polyester-type mono (meth)acrylate esters obtained by subjecting lactones such as ε-caprolactone and γ-butyrolactone to ring-opening polymerization while using, as initiators, the above-described (poly)alkylene glycol mono(meth)acrylate esters such as (meth)acryloyloxyethyl mono- or poly(n≥2)caplolactone; ester-type(meth)acrylates obtained by reacting dibasic acids to the above-described (poly)alkylene glycol mono(meth) acrylate esters such as 2-(meth)acryloyloxyethyl-2-hydroxyethylphthalate and 2-(meth)acryloyloxyethyl-2-hydroxyethyl succinate to half-esterify the dibasic acids and then reacting alcohols or alkylene glycols to the other carboxyl groups;

the mono(meth)acrylates of polyfunctional hydroxyl compounds having 3 or more hydroxyl groups, such as glycerol mono(meth)acrylate and dimethylolpropane mono(meth-acrylate); halogen-containing (meth)acrylates such as 3-chloro-2-hydroxypropyl(meth)acrylate, octafluorooctyl (meth)acrylate and tetrafluoroethyl(meth)acrylate; UV-absorbing monomers such as 2-(4-benzoxy-3-hydroxyphenoxy)ethyl(meth)acrylate and 2-(2'-hydroxy-5-(meth) acryloyloxyethylphenyl)-2H-benzotriazole, said UV-absorbing monomers being preferably copolymerized especially to provide pigments with improved light resistance; and α-hydroxymethyl-substituted acrylates such as ethyl-α-hydroxymethyl acrylate.

To the carboxyl groups or hydroxyl groups in the A block of the resulting high-molecular dispersant, a monomer which has a reactive group such as an addition-polymerizable group may be reacted to provide the side chains of the polymer with addition-polymerizable groups. Although not particularly limited, methacrylic groups can be introduced, for example, into a block polymer, which has been obtained by polymerizing (meth)acrylic acid as a copolymerization component and includes the A block, by reacting glycidyl methacrylate to the block polymer, and acrylic groups can be introduced, for example, into a block polymer, which has been obtained by polymerizing 2-hydroxyethyl(meth)acrylate as a copolymerization monomer component and has hydroxyl groups, by reacting acryloyloxyethyl isocyanate to the block polymer. These high-molecular dispersants with the above-described addition-polymerizable groups contained on side chains thereof can be used as polymers to be subjected to ultraviolet curing or electron beam curing.

The A block and C block in the high-molecular dispersant may be the same or different. Therefore, they may have the same acid value or different acid values, and further, they may have the same monomer composition or different monomer compositions. It is, however, necessary for each of them to have such a composition as giving such an acid value as described above.

Next, the B block in the high-molecular dispersant is a water-insoluble polymer block. As monomers usable for forming the B block, the above-described monomers can be mentioned. Preferred are hydrophobic monomers including (meth)acrylates having an aromatic ring, for example, benzyl (meth)acrylate and (meth)acrylates having an alicyclic alkyl group, for example, cyclohexyl(meth)acrylate. Particularly important is that the B block is the water-insoluble polymer block, and therefore, the proportion of units of such a monomer contained in the B block may preferably be 50 wt % or higher. Owing to this monomer composition, the solubility of the B block in water is reduced so that, even when used in an aqueous solvent, B blocks do not separate from the pigment.

For the formation of the B block, it is also possible to use a monomer having an aliphatic, aromatic or alicyclic alkyl group which is preferably non-functional, or a monomer having an acid group, amino group or hydroxyl group. It is, however, to be noted that the monomer may have an acid group but the B block should not become soluble in water upon neutralization of such acid groups and that the monomer may have an amino group or a quaternary ammonium base group but the B block should not be rendered soluble in water with an acid or should not be soluble in water for the existence of such quaternary ammonium base groups. Especially, the combined use of a monomer having an amino group is preferred as the resulting high-molecular dispersant is provided with improved coatability for a pigment, which has been treated with a synergist having an acid group such as a sulfonic group, through ionic bonding with surfaces of the pigment, and the combined use of a monomer having a hydroxyl group is also preferred as the resulting high-molecular dispersant is provided with improved coatability for a pigment through hydrogen bonding with surfaces of the pigment.

For the formation of the B block, a monomer having two or more addition-polymerizable groups may also be used insofar as it is such a hydrophobic monomer as described above. The use of a bifunctional or higher functionality monomer forms bonding between two types of functional groups themselves in the resulting polymer. As a result, the B block is polymerized in a branched form, thereby providing a multibranched, star block polymer in which block polymers A are grafted on the B block. No particular limitation is imposed on the bifunctional or higher functional monomer to be used, and examples include divinylbenzene; the (meth)acrylates of diols such as ethylene glycol, propylene glycol, polyethylene glycol, polypropylene glycol and cyclohexanedimethanol; polyester polyol(meth)acrylates; the (meth)acrylates of polyhydroxy compounds such as trimethylolpropane and pentaerythritol; products obtained by reacting acid groups of monomers having the acid groups with glycidyl groups of monomers having the glycidyl groups; and products obtained by reacting hydroxyl-containing monomers with isocyanato-containing monomers.

When a monomer having an acid group is used for the formation of the B block, the monomer having the acid group may be used in an amount such that the B block is provided with an acid value of preferably smaller than 20 mgKOH/g, more preferably 10 mgKOH/g or smaller. When a monomer having an amino group is used, the monomer having the amino group may be used in an amount such that the B block is provided with an amine value of preferably 100 mgKOH/g or smaller, more preferably 50 mgKOH/g or smaller. Although a monomer having nonionic hydrophilic groups like polyethylene glycol may also be used, the inclusion of many nonionic hydrophilic groups in the resulting B block is not preferred because the resulting high-molecular dispersant is dissolved in water.

The high-molecular dispersant for use in the present invention is such an A-B diblock polymer or A-B-C triblock polymer as described above. A description will now be made about the quantitative relationship between the A block or the A and C blocks ("the A block" and "the C block" will hereinafter be called "the hydrophilic blocks") and the B block in the high-molecular dispersant. The overall acid value of the high-molecular dispersant, said acid value being originated from the hydrophilic block or blocks, may preferably range from 20 to 250 mgKOH/g, and within this range, the weight ratio of the hydrophilic block or blocks to the B block and the acid value are adjusted. If the above-described acid value is smaller than 20 mgKOH/g, the high-molecular dispersant does not have compatibility with water and cannot be brought into a state that it is dissolved or dispersed in water. If the acid value exceeds 250 mgKOH/g, on the other hand, the high-molecular dispersant itself is provided with unduly high hydrophilicity so that, when a pigment is treated with the high-molecular dispersant, the B block separates from the pigment and the high-molecular dispersant is dissolved in water. Even when the resulting aqueous pigment dispersion is used for the coloration of an article, the resulting color coating is provided with inferior waterproofness because of the high acid value. The overall acid value of the high-molecular dispersant may be preferably from 30 to 200 mgKOH/g, more preferably from 40 to 180 mgKOH/g.

The molecular weight of the high-molecular dispersant for use in the present invention may be preferably from 1,000 to 20,000, more preferably from 3,000 to 15,000, still more preferably from 5,000 to 10,000 as a styrene-equivalent number average molecular weight measured by gel permeation chromatography (hereinafter abbreviated as "GPC"). It is to be noted that hereinafter, the term "number average molecular weight" will means a styrene equivalent determined by GPC and will be called simply "molecular weight". A molecular weight lower than 1,000 does not allow the resulting high-molecular dispersant to exhibit steric hindrance after its adsorption on a pigment so that the high-molecular dispersant is provided with reduced pigment dispersibility. A molecular weight higher than 20,000, on the other hand, results in an aqueous pigment dispersion having a higher viscosity, and therefore, the dispersion of a pigment does not proceed well. Moreover, a single molecule of the high-molecular dispersant may adsorb on plural pigment particles, thereby possibly causing coagulation of the pigment.

Further, no particular limitation is imposed on the polydispersity index (hereinafter abbreviated as "PDI"), which is the ratio of a weight average molecular weight to the number average molecular weight in the high-molecular dispersant for use in the present invention. Although a high-molecular dispersant of very small PDI (1.3 or smaller) can be obtained by living radical polymerization, PDI is not very significant because what is important in the present invention is that the high-molecular dispersant takes the above-described block structure. Nonetheless, excessively broad PDI means that the high-molecular dispersant includes from a polymer of high molecular weight to a polymer of low molecular weight, and therefore, a phenomenon other than that occurs within the above-described molecular weight range may take place. Such excessively broad PDI is not preferred accordingly. With respect to the high-molecular dispersant for use in the present invention, PDI may be preferably 1.7 or smaller, more preferably 1.6 or smaller.

Next, concerning the weight ratio of the hydrophilic block or blocks to the B block in the high-molecular dispersant, the hydrophilic block or blocks may preferably amount to 20 wt % or more of the entire high-molecular dispersant. Concerning the overall molecular weight of the high-molecular dispersant, the molecular weight of the B block in the whole high-molecular dispersant may preferably amount to less than 80%. Because, if the B block amounts to 80% or more of the weight and molecular weight of the high-molecular dispersant, the addition of the high-molecular dispersant to water may result in coagulation of B blocks themselves due to the strong hydrophobicity of the B block despite the existence of the hydrophilic block or blocks in the high-molecular dispersant so that the high-molecular dispersant may become insoluble as a whole in water even when neutralized with an alkali. Preferably, the content of the hydrophilic block or blocks in the high-molecular dispersant may be 30 wt % or higher.

Concerning the molecular weight, the molecular weight of the B block may be preferably 80% or lower, more preferably 70% or lower of the overall molecular weight of the high-molecular dispersant. In such a range, the dissolution of the high-molecular dispersant in water results in very fine dispersion of B blocks owing to the inclusion of hydrophilic blocks, thereby making it possible to afford an aqueous solution which is clear to the eye.

A description will next be made about the polymerization process for obtaining the high-molecular dispersant for use in the present invention. This polymerization process is not the conventional radical polymerization or living radical polymerization, but is novel living radical polymerization. In addition, different from the conventional living radical polymerization process, this living radical polymerization uses neither a metal compound nor a ligand, and does not need using a special compound such as a nitroxide compound, dithiocarboxylate ester or xanthate compound. This living radical polymerization can be readily conducted by simply using an organoiodide compound as an initiating compound and a catalyst in combination in the conventional radical polymerization that uses addition-polymerizable monomers and a radical generator as a polymerization initiator.

The above-described polymerization process proceeds through a reaction mechanism represented by the following reaction formula (1), and is a reversible activation reaction of a dormant species, Polymer-X (P—X), into a propagating radical.

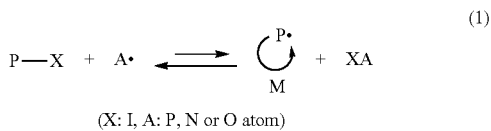

(X: I, A: P, N or O atom)

Although this polymerization mechanism may vary depending on the kind of a catalyst, the polymerization mechanism is considered to proceed as will be described next. In the reaction formula (1), P• generated from the polymerization initiator reacts to XA to form a catalyst A• in situ. A• acts as an activator for P—X, and owing to its catalytic effect, P—X is activated at high frequency.

Described more specifically, a free radical generated from the polymerization initiator in the presence of the initiating compound with iodine (X) bonded thereto extracts an active hydrogen or active halogen atom from the catalyst to form a catalyst radical A•. This A• then extracts X from the initiating compound to form XA. The initiating compound, therefore, becomes a radical, to which a monomer polymerizes so that X is immediately extracted from XA to prevent any termination reaction. Under heat or the like, A• extracts X from the end X to form XA and an end radical. To this end radical, the monomer reacts so that X is immediately given to the end radical to stabilize the end radical. Through repetition of the above-described reaction, the polymerization proceeds to permit control of the molecular weight and structure. It is, however, to be noted that the above-described polymerization process may be accompanied by a bimolecular termination reaction or disproportionation in some instances.

The initiating compound, which is used in the present invention to initiate living radical polymerization, is a conventionally-known organoiodide compound, and is not specifically limited. Specific examples include alkyl iodides such as methyl iodide, ethyl iodide, propyl iodide, isopropyl iodide, butyl iodide, t-butyl iodide, iodophenylmethane, iododiphenylmethane, iodotriphenylmethane, 2-iodo-1-phenylethane, 1-iodo-1-phenylethane, 1-iodo-1,1-diphenylethane and diiodomethane; iodine-containing organohalide compounds such as iododichloromethane, iodochloromethane, iodotrichloromethane and iododibromomethane; iodoalcohols such as 1-iodoethanol, 1-iodopropanol, 2-iodopropanol, 2-iodo-2-propanol, 2-iodo-2-methylpropanol, 2-phenyl-1-iodoethanol and 2-phenyl-2-iodoethanol; ester compounds of these iodoalcohols with carboxylic compounds such as acetic acid, butyric acid and fumaric acid; iodocarboxylic acids such as iodoacetic acid, α-iodopropionic acid, α-iodobutyric acid, α-iodoisobutyric acid, α-iodovaleric acid, α-iodoisovaleric acid, α-iodocaproic acid, α-iodophenylacetic acid, α-iododiphenylacetic acid, α-iodo-α-phenylpropionic acid, α-iodo-β-phenylpropionic acid, β-iodopropionic acid, β-iodobutyric acid, β-iodoisobutyric acid, β-iodovaleric acid, β-iodoisovaleric acid, β-iodocaproic acid, β-iodophenylacetic acid, β-iododiphenylacetic acid, β-iodo-α-phenylpropionic acid and β-iodo-β-phenylpropionic acid; esterified compounds of these iodocarboxylic acids with methanol, ethanol, phenol, benzyl alcohol and the above-described iodoalcohols; anhydrides of these iodocarboxylic acids; acid anhydrides such as the chlorides and bromides of these iodocarboxylic acids; cyano-containing iodides such as iodoacetonitrile, 2-cyano-2-iodopropane, 2-cyano-2-iodobutane, 1-cyano-1-iodocyclohexane and 2-cyano-2-iodovaleronitrile; and the like.

Also usable are bifunctional initiating compounds having two iodine atoms, including, for example, 1,2-diiodoethane, 1,2-diiodotetrafluoroethane, 1,2-diiodotetrachloroethane, 1,2-diiodo-1-phenylethane, and reaction products of the above-described iodocarboxylic acids such as α-iodoisobutyric acid with diols such as ethyleneglycol or diamines such as hexamethylenediamine.

As these compounds, their commercial products can be used as they are. They can also be produced by conventionally-known processes. Organoiodide compounds for use in the present invention can be obtained, for example, through reactions of azo compounds such as azobisisobutyronitrile with iodine, or by subjecting organohalide compounds, which are similar to the above-described organoiodide compounds except for the substitution of their iodine atoms with other halogen atoms such as bromine or chlorine atoms, to halogen exchange reactions with iodide salts such as quaternary ammonium iodide and sodium iodide. It is to be noted that no particular limitation is imposed on their production processes.

The catalyst for use in the present invention is an organic phosphorus compound, organic nitrogen compound or organic oxygen compound, which extracts an iodine atom from the above-described initiating compound to form a radical, and may preferably be one or more compounds selected from iodine-containing phosphorus halides, phosphite compounds and phosphinate compounds as organic phosphorus compounds, imide compounds and hydantoin compounds as organic nitrogen compounds, and phenolic compounds, iodoxyphenyl compounds and vitamins as organic oxygen compounds.

No particular limitation is imposed on these compounds. Specifically exemplified as phosphorus compounds, iodine-containing phosphorus halides, phosphite compounds and phosphinate compounds can be mentioned including, for example, dichloroiodophosphorus, dibromoiodophosphorus, phosphorus triiodide, dimethyl phosphite, diethyl phosphite, dibutyl phosphite, diperfluoroethyl phosphinate, diphenyl phosphite, dibenzyl phosphite, bis(2-ethylhexyl)phosphite, bis(2,2,2-trifluoroethyl)phosphite, diallyl phosphite, ethylene phosphite, ethoxyphenyl phosphinate, phenylphenoxy phosphinate, ethoxymethyl phosphinate, phenoxymethyl phosphinate, and the like.

As nitrogen compounds, imide compounds and hydantoin compounds can be mentioned including, for example, succinimide, 2,2-dimethylsuccinimide, α,α-dimethyl-β-methyl-succinimide, 3-ethyl-3-methyl-2,5-pyrrolidinedione, cis-1,2,3,6-tetrahydrophthalimide, α-methyl-α-propylsuccinimide, 5-methylhexahydroisoindol-1,3-dione, 2-phenylsuccinimide, α-methyl-α-phenylsuccinimide, 2,3-diacetoxysuccinimide, maleimide, phthalimide, 4-methylphthalimide, N-chlorophthalimide, N-bromophthalimide, N-bromophthalimide, 4-nitrophthalimide, 2,3-naphthalenecarboximide, pyromellitic diimide, 5-bromoisoindol-1,3-dione, N-chlorosuccinimide, N-bromosuccinimide, N-iodosuccinimide, hydantoin, diiodohydantoin, and the like.

As oxygen compounds, phenolic compounds each having a phenolic hydroxyl group which is a hydroxyl group bonded to an aromatic ring, iodoxyphenyl compounds as iodides of such phenolic hydroxyl groups, and vitamins can be mentioned. Examples of the phenolic compounds include phenol, hydroquinone, methoxyhydroquinone, t-butylphenol, t-butylmethylphenol, catechol, resorcinol, di-t-butylhydroxytoluene, dimethylphenol, trimethylphenol, di-t-butylmethoxyphenol, polymer obtained by polymerizing hydroxystyrene, and hydroxyphenyl-carrying microparticles of the polymer. As these compounds are incorporated as polymerization inhibitors for the preservation of monomers, catalytic effects are also exhibited by using commercially-available monomers as they are without purification. The iodoxyphenyl compounds include thymol iodide and the like, and the vitamins include vitamin C, vitamin E and the like.

The amount of the catalyst may preferably be smaller than the number of moles of the polymerization initiator. If the number of moles of the catalyst is excessively large, the polymerization is controlled so much that it does not proceed.

Next, as the polymerization initiator for use in the present invention, conventionally-known one is usable. No particular limitation is imposed on it, and commonly-employed organic peroxides and azo compounds can be used. Specific examples include benzoyl peroxide, dicumyl peroxide, diisopropyl peroxide, di-t-butyl peroxide, t-butyl peroxybenzoate, t-hexyl peroxybenzoate, t-butyl peroxy-2-ethylhexanoate, t-hexyl peroxy-2-ethylhexanoate, 1,1-bis(t-butylperoxy)-3,3,5-trimethylcyclohexane, 2,5-dimethyl-2,5-bis(t-butylperoxy)hexyl-3,3-isopropylhydroperoxide, t-butyl hydroperoxide, dicumyl hydroperoxide, acetyl peroxide, bis(4-t-butylcyclohexyl) peroxydicarbonate, isobutyl peroxide, 3,3,5-trimethylhexanoyl peroxide, lauryl peroxide, 1,1-bis(t-butylperoxy)-3,3,5-trimethylcyclohexane, 1,1-bis(t-hexylperoxy)-3,3,5-trimethylcyclohexane, 2,2'-azobis(isobutyronitrile), 2,2'-azobis(2,4-dimethylvaleronitrile), 2,2'-azobis(isobutyrate), 2,2'-azobis(methoxydimethylvaleronitrile) and the like.

The polymerization initiator can be used as much as preferably from 0.001 to 0.1 molar times, more preferably from 0.002 to 0.05 molar times the number of moles of the monomer, because an unduly small use amount of the initiator results in insufficient polymerization while an excessively large use amount of the initiator has a potential problem that a polymer of the addition-polymerizable monomer alone may be formed.

By using at least the organoiodide as an initiating compound, the addition-polymerizable monomers, the polymerization initiator and the catalyst and conducting polymerization as described above, the high-molecular dispersant for use in the present invention can be obtained. The polymerization may be conducted in bulk without using any organic solvent, but solution polymerization that uses a solvent is preferred. No particular limitation is imposed on the organic solvent to be used. Examples include hydrocarbon solvents such as hexane, octane, decane, isodecane, cyclohexane, methylcyclohexane, toluene, xylene, ethylbenzene, and cumene;

alcohol solvents such as methanol, ethanol, propanol, isopropanol, butanol, isobutanol, hexanol, benzyl alcohol and cyclohexanol; glycol solvents such as ethylene glycol, diethylene glycol, propylene glycol, dipropylene glycol, methyl cellosolve, ethyl cellosolve, butyl cellosolve, propylene glycol monomethyl ether, propylene glycol monoethyl ether, propylene glycol propyl ether, diglyme, triglyme, dipropylene glycol dimethyl ether, butyl carbitol, butyl triethylene glycol, methyl dipropylene glycol, methyl cellosolve acetate, propylene glycol monomethyl ether acetate, dipropylene glycol butyl ether acetate, and diethylene glycol monobutyl ether acetate; ether solvents such as diethyl ether, dipropyl ether, methyl cyclopropyl ether, tetrahydrofuran, dioxane, and anisole;

ketone solvents such as methyl ethyl ketone, diethyl ketone, isobutyl methyl ketone, cyclohexanone, isophorone, and acetophenones; ester solvents such as methyl acetate, ethyl acetate, butyl acetate, propyl acetate, methyl butyrate, ethyl butyrate, caprolactone, methyl lactate, and ethyl lactate; halogenated solvents such as chloroform and dichloroethane; amide solvents such as dimethylformamide, dimethylacetamide, pyrrolidone, N-methylpyrrolidone, and caprolactam; and dimethyl sulfoxide, sulfolane, tetramethylurea, ethylene carbonate, propylene carbonate, dimethyl carbonate, ethyl carbonate, nitromethane, acetonitrile, nitrobenzene, dioctyl phthalate, and the like. Any organic solvent can be used in the present invention insofar as it can dissolve the organoiodide, catalyst, addition-polymerizable monomers and polymerization initiator used in the present invention.

In the present invention, the above-described block polymer is used as a high-molecular dispersant in an aqueous pigment dispersion. It is, therefore, particularly preferred to neutralize a polymerization mixture with an aqueous alkaline solution upon neutralization of the A block or the A and C blocks in the high-molecular dispersant after its solution polymerization, and then to use the thus-neutralized polymerization mixture for the dispersion treatment of the pigment as it is. Accordingly, the organic solvent for use in the polymerization may preferably be an organic solvent which is soluble in water. Examples of particularly preferred organic solvents, therefore, include alcohol solvents and glycol solvents.

The solid content (monomer concentration) in the polymerization mixture may be from 5 to 80 wt %, with from 20 to 60 wt % being preferred, although no particular limitation is imposed thereon. If the solid content is lower than 5 wt %, the monomer concentration is so low that the polymerization may not be brought to completion. On the other hand, 80 wt % to bulk polymerization leads to a polymerization mixture having unduly high viscosity, and hence, to a potential problem that stirring may become difficult or the polymerization degree may be reduced.

The polymerization temperature is not particularly limited, and may be preferably from 0° C. to 150° C., more preferably from 30° C. to 120° C. The polymerization temperature should be adjusted depending on the half-life of each polymerization initiator. Although it is preferred to continue the polymerization until the monomer is used up, the polymerization time is not particularly limited and may be, for example, from 0.5 hour to 48 hours, and as a practical time, preferably from 1 hour to 24 hours, more preferably from 2 hours to 12 hours.

The atmosphere is not particularly limited, and the polymerization may be conducted in air. In other words, oxygen may exist in a usual range in the system, or if necessary, the polymerization may be conducted under a nitrogen stream to eliminate oxygen. As the materials to be used, commercial products can be used as they are although impurities may be removed by distillation or with activated carbon, alumina or the like. Further, the polymerization may be conducted under shading, but no problem arises even when the polymerization is conducted in a transparent vessel such as a glass vessel.

By using at least the organoiodide as an initiating compound, the addition-polymerizable monomers, the polymerization initiator and the catalyst and conducting polymerization as described above, the diblock polymer or triblock polymer can be obtained as the high-molecular dispersant for use in the present invention.

A description will now be made about the polymerization process of the diblock polymer and triblock polymer. Concerning the diblock polymer, a addition-polymerizable monomer having at least an acid group is polymerized in the presence of a monofunctional organoiodide as an initiating compound by the above-described process to obtain a polymer block (which will be designated as "the A block"). This polymer has been substituted at an end thereof with an iodine atom, and therefore, has been stabilized. The monomer is added further, and by dissociating the iodine atom under heat or the like, polymerization can be initiated again.

This A block is collected and purified, and is dissolved again in an organic solvent. Using the A block as an initiating compound and preferably adding the catalyst and polymerization initiator further, the next monomer is added and polymerized. As a result, the end iodine atom of the polymer block is dissociated to initiate polymerization again, so that a diblock polymer can be obtained with a B block linked to the A block. As an alternative, the diblock polymer can also be obtained by adding the monomer for the B block without collecting the A polymer block after the formation of the A block, preferably adding the catalyst and polymerization initiator further, and then conducting polymerization.

The monomer for the A block does not require complete polymerization insofar as the A block is provided with the above-described acid value and the B block is not soluble in water. Accordingly, the monomer for the B block may be added and polymerized at the time point that the polymerization degree of the monomer for the A block has reached preferably 50% or higher, more preferably 80% or higher. The addition can be made at once, or can be made dropwise by a dropping device. Dropwise addition makes it possible to impart a gradient to the concentration of the monomer in the block polymer B, that is, to provide a gradient polymer.

The formations of the blocks can be reversed. Namely, the A-B diblock polymer may also be obtained likewise by first polymerizing the monomer for the B block as a water-insoluble polymer and then polymerizing a monomer which comprises at least a monomer having an acid group.

In the case of the triblock polymer, a diblock polymer is obtained by polymerizing a monomer containing an acid group and then polymerizing a hydrophobic monomer as in the above-described diblock polymer. After the diblock polymer is collected, purified and then dissolved in a solvent or immediately after the block polymer is obtained, a monomer containing at least an acid group is added as a copolymer component, the polymerization initiator and catalyst may preferably be added further, and polymerization is conducted.

Using the thus-obtained polymer as a C block, an A-B-C triblock polymer can be obtained. As described above, it is necessary that the B block is insoluble in water and the A and B blocks become soluble in water upon neutralization. Insofar as the polymerization degree of the monomer for the B block is preferably 80% or more, polymerization can be conducted by adding the monomer for the C block.

The use of a similar composition as the A block for the C block makes it possible to obtain an A-B-A triblock polymer, and the polymerization of a C block having a monomer composition different from the monomer for the A block makes it possible to provide a A-B-C triblock polymer. When the monomer for the B block is polymerized in a state that the polymerization degree of the monomer for the A block has not reached 100% yet, and further, a monomer of a composition similar to that of the monomer for the A block is added and polymerized, an A-B-C triblock polymer can also be obtained. An A-B-C triblock polymer can also be obtained when the monomer for the C block is added and polymerized in a state that the monomer for the B block has not been completely polymerized yet. In addition, an A-B-C(A) triblock copolymer can also be obtained by using a bifunctional initiating compound, polymerizing a hydrophobic monomer, and then polymerizing a monomer containing an acid group.

In the polymerization to be used in the present invention, the molecular weight of the resulting polymer can be controlled depending on the amount of the initiating compound. By setting the number of moles of a monomer relative to the number of moles of the initiating compound, the resulting polymer can be controlled to a desired molecular weight or the magnitude of its molecular weight can be controlled. When 500 moles of a monomer having a molecular weight of 100 are used and polymerized by using 1 mole of the initiating compound, for example, the molecular weight is calculated to be 1×100×500=50,000. Namely, a preset molecular weight can be calculated by:

Initiating compound 1 mole×the molecular weight of a monomer×the molar ratio of the monomer to the initiating compound In some instances, however, the polymerization process to be used in the present invention may be accompanied by a side reaction such as bimolecular termination or disproportionation, so that the actual molecular weight may not be controlled to the above-described calculated molecular weight. Preferred is a polymer obtained without such a side reaction. Nonetheless, the polymer may have a greater molecular weight as a result of coupling or a smaller molecular weight as a result of termination. Further, the polymerization degree may not be required to be 100%. In such a case, the remaining monomer may be distilled off, or upon precipitation of the resulting block polymer, may be removed, or after the desired block polymer is obtained, the polymerization initiator and catalyst may be added to complete the polymerization. Insofar as the diblock polymer or triblock polymer for use in the present invention has been formed or contained, no problem arises even if the individual block polymers are separately contained. Preferably, however, the high-molecular dispersant may contain the diblock polymer or triblock polymer of the present invention at 50 wt % or higher, with 80 wt % or higher being more preferred. Further, PDI becomes broader when the above-described side reaction is accompanied. However, no particular limitation is imposed on the PDI of the block polymer. Nonetheless, its PDI may be preferably 1.7 or smaller, more preferably 1.6 or smaller.

The high-molecular dispersant for use in the present invention may be used, as it is, without neutralization. As an alternative, the acid groups in the A block or the acid groups in the A and C blocks may be neutralized to use the high-molecular dispersant for the preparation of an aqueous pigment dispersion. After completing the polymerization and obtaining the A-B diblock polymer or the A-B-C triblock polymer, an alkali may be added to make the block polymer soluble in water. No particular limitation is imposed on the alkali that neutralizes acid groups, and illustrative are ammonia; amines such as diethanolamine, triethylamine, diethanolamine and triisopropanolamine; terminal amine derivatives of polyalkylene glycols; and alkali metal salts such as lithium hydroxide, sodium hydroxide, potassium hydroxide, sodium carbonate, calcium hydroxide and zinc hydroxide.

As described above, a diblock polymer or triblock polymer can be obtained as a high-molecular dispersant for use in the present invention. By neutralizing the diblock polymer or triblock polymer, an aqueous solution of the high molecular dispersant can be obtained.

A description will next be made about the preparation method of the aqueous pigment dispersion according to the present invention, which comprises coating the pigment with the high-molecular dispersant and using the coated pigment. The aqueous pigment dispersant according to the present invention is obtained by dispersing the pigment in water while using at least the above-described pigment, water, and the high-molecular dispersant neutralized with the alkali. As the preparation method of the aqueous pigment dispersion, the following methods are preferred.

(1) A method that mixes at least the pigment, water, an organic solvent, an alkali and the above-described high-molecular dispersant to disperse the pigment in the water, adds an acid to the resulting liquid mixture such that the dissolved high-molecular dispersant is caused to precipitate to coat the pigment with the high-molecular dispersant, and then disperses the coated pigment in an aqueous alkaline medium.

(2) A method that kneads at least the pigment and the above-described high-molecular dispersant (kneading step), adds the resulting kneaded mixture to a poor solvent for the high-molecular dispersant such that the high-molecular dispersant is caused to precipitate in the poor solvent to coat the pigment with the high-molecular dispersant, and then disperses the coated pigment in an aqueous alkaline medium.

A description will first be made about the preparation method (1). According to this method, depending on the high-molecular dispersant employed, the high-molecular dispersant may coagulate to make difficult the dispersion of the pigment because the B block is not soluble in water when the high-molecular dispersant neutralized after polymerization is singly added to water. It is, therefore, preferred to add an organic solvent to a solution of the high-molecular dispersant such that the B block is made compatible with water and is dissolved, dispersed or swollen in the water.

As the organic solvent, the above-exemplified organic solvents can be used. Although not particularly limited, the use of an organic solvent having solubility in water is preferred. This organic solvent is compatible with the B block and is also compatible with water, thereby dissolving, dispersing or swelling the B block in an aqueous solvent. As a consequence, the B block is made compatible with water in the aqueous solvent so that the adsorption of the high-molecular dispersant, specifically the B block on the pigment is promoted.

No particular limitation is imposed on the amount of the organic solvent to be used as described above. The organic solvent may be only in the amount of the solvent used for the polymerization, or may be added further. The organic solvent should be used in an amount such that the B block is prevented from coagulation to avoid the precipitation of the high-molecular dispersant itself.

By using the pigment, the alkali-neutralized high-molecular dispersant, the water and the organic solvent as described above, the pigment is dispersed by a conventionally-known method. The pigment concentration in the dispersion may be from 0.5 to 70 wt %, preferably from 5 to 50 wt % based on the dispersion although it varies depending on the kind and application purpose of the pigment. The use amount of the high-molecular dispersant may desirably be from 5 to 500 parts by weight per 100 parts by weight of the pigment. In other words, the coated pigment which is coated with the high-molecular dispersant may preferably contain the pigment as much as from 20 to 95%.

The dispersion method of the pigment is a conventionally-known method, and is not specifically limited. The pigment, the alkali-neutralized high-molecular dispersant, the water and the organic solvent are combined and stirred, and by a conventionally-known disperser, the pigment is dispersed. As the disperser, it is possible to use, for example, a kneader, an attritor, a ball mill, a sand mill or medium-containing, horizontal disperser making use of a glass or zircon medium, a colloid mill or the like. In the case of a bead mill, bead media of 1 μm or smaller are preferred as its medium.

The thus-obtained, aqueous pigment dispersion may be provided as it is, or by a centrifuge, ultracentrifuge or filter, coarse particles which may exist slightly may be removed. The aqueous pigment dispersion obtained in this dispersion step will be called "the aqueous pigment pre-dispersion".

This aqueous pigment pre-dispersion may be applied to an article as it is. To obtain still higher dispersion stability and performance, however, it is preferred to have the high-molecular dispersant precipitated on the surfaces of pigment particles such that the pigment particles are encapsulated with B blocks. In the form of the aqueous pigment pre-dispersion, the B block in the high-molecular dispersant is in a state that it is compatible with water owing to the existence of the organic solvent that is compatible with the B block. Therefore, B blocks separate from the pigment, and the aqueous pigment pre-dispersion is similar to conventional aqueous pigment dispersions.

A description will next be made about a precipitation step in which the high-molecular dispersant is caused to capsulate on pigment particles. The aqueous pigment pre-dispersion obtained as described above is provided as it is or with its pigment content diluted to 10 wt % or lower with water. The neutralized high-molecular dispersant may be added to give a desired pigment content as needed. As the acid groups of the high-molecular dispersant have been neutralized with the alkali, the high-molecular dispersant is ionized and dissolved in water. By adding an acid to the high-Molecular dispersant, the high-molecular dispersant can be rendered insoluble in water. In this manner, the high-molecular dispersant can be caused to deposit or capsulate on the pigment particles. No particular limitation is imposed on the acid to be used for the deposition or capsulation, but usable examples include inorganic acids such as hydrochloric acid, sulfuric acid and nitric acid; and organic acids such as acetic acid, propionic acid and toluenesulfonic acid. The acid may be added as it is, but it is preferred to use the acid in the form of an aqueous solution of 10 wt % or lower.

While stirring the aqueous pigment pre-dispersion by a conventionally-known method, particularly preferably by using a stirrer, which can be driven at a high speed, such as a dissolver after its dilution with water, the acid is gradually added. The amount of the acid to be added is preferably at least equimolar, more preferably 1.1 molar times or more relative to the alkali with which the A block and C block in the high-molecular dispersant have been neutralized.

After the high-molecular dispersant is caused to precipitate by the addition of the acid, the resultant precipitate is collected by filtration. After the precipitation, the mixture may be heated as needed such that the precipitated particles are caused to coagulate to facilitate the filtration. It is preferred to thoroughly remove the ionic substance and organic solvent, which still adhere on the precipitate, by this filtration.

The aqueous pigment paste obtained by the filtration may then be dried and ground for use in the next step. It is, however, preferred to use the aqueous pigment paste as it is, because the use of the aqueous pigment paste as it is can avoid the fusion of the high-molecular dispersant through drying and can hence obviate grinding, and further, the particle size of the pigment remains unchanged from the particle size at the time of the dispersion.

A description will next be made about the preparation method (2). According to this method, at least the pigment and the high-molecular dispersant are kneaded by a conventional method. The amount of the high-molecular dispersant to be used may desirably be from 5 to 500 parts by weight per 100 parts by weight of the pigment as described above. The high-molecular dispersant may be added beforehand such that a desired pigment content can be achieved upon kneading, or as an alternative, the high-molecular dispersant may be added in an amount of from 20 to 100 wt % based on the pigment, and after kneading, the high-molecular dispersant may be added further to achieve the desired pigment content. Although no particular limitation is imposed on the kneading method, the kneading may be performed for from 30 minutes to 60 hours, preferably for from 1 hour to 12 hours either at room temperature or with heating by a conventionally-known kneading machine such as, for example, a kneader, extruder or ball mill. It is also preferred to make combined use of a carbonate, chloride or the like as a fine medium for microparticulating the pigment and also to make combined use of a viscous organic solvent such as ethylene glycol or diethylene glycol to impart lubricity or the like, in the mixture as needed. The carbonate, chloride or the like is used from 1 to 30 times by weight, preferably from 2 to 20 times by weight relative to the pigment. The use amount of the viscous organic solvent is adjusted depending on the viscosity during the kneading of the pigment.

As the high-molecular dispersant in the above method, the solution of the water-insoluble high-molecular dispersant not subjected to neutralization with the alkali after its polymerization and is insoluble in water, or as a solution of the high-molecular dispersant with its acid groups having been neutralized with the alkali after its polymerization. The use amount of the high-molecular dispersant relative to the pigment is adjusted beforehand based on the above-described amount.

When the high-molecular dispersant in the above-described kneaded mixture is in an unneutralized form, the kneaded mixture is added to an organic solvent in which the high-molecular dispersant is not soluble, preferably to a solvent having low solubility for the high-molecular dispersant, for example, water, methanol, hexane or a mixture thereof to cause the high-molecular dispersant to precipitate such that the high-molecular dispersant is allowed to deposit or capsulate on particles of the pigment. When the high-molecular dispersant is used in a neutralized form, on the other hand, the kneaded mixture is added to an aqueous solution of an acid such that the high-molecular dispersant is neutralized to deposit or capsulate on the particles of the pigment. The pigment coated as described above is then collected by filtration and thoroughly washed with water. Especially when the kneading was conducted while using the carbonate, chloride or the like, water washing is needed to remove the carbonate, chloride or the like. The aqueous pigment paste may then be dried and ground into powder, although it may preferably be used as it is.

By the above-described preparation method (1) or (2), the aqueous pigment dispersion according to the present invention can be obtained via the treated pigment which is coated with the high-molecular dispersant.

The above-described treated pigment is next added to an aqueous alkaline solution for its dispersion. As an alkali, the above-exemplified alkalis can be used. Further, an organic solvent can also be added as needed. Usable as this organic solvent is an organic solvent, which does not dissolve the B block and is soluble in water. This organic solvent differs depending on the kind of the polymer of the B block, and therefore, cannot be specified. However, examples include water-soluble organic solvents containing two or more hydroxyl groups per molecule, such as ethylene glycol, diethylene glycol, triethylene glycol, polyethylene glycol, propylene glycol, 1,4-butanediol, 1,6-hexanediol, dipropylene glycol, glycerin and 1,2-hexanediol; and mono or di($C_1$-$C_4$ lower alkyl)ethers of dimeric and higher oligomeric polyalkylene glycols. The content of the organic solvent may preferably be such that the B block is not dissolved, with less than 100% of the content of the high-molecular dispersant being more preferred, although no limitation is imposed on the content.

By adding water with the alkali contained therein, the treated pigment, and if necessary, the organic solvent, adjusting the resulting mixture to a desired pigment concentration, and conducting the above-describing mixing and stirring and dispersion, the aqueous pigment dispersion according to the present invention can be obtained. The A block and C block in the high-molecular dispersant in the treated pigment are neutralized with the alkali to dissolve them in water. The B block is not soluble in water, and therefore, does not separate from the pigment, thereby making it possible to obtain the aqueous pigment dispersion according to the present invention in which the pigment is encapsulated with the high-molecular dispersant. The thus-obtained, aqueous pigment dispersion may be provided as it is. From the standpoint of providing the dispersion with higher reliability, however, it is preferred to remove coarse particles, which may exist slightly, by a centrifuge, ultracentrifuge or filter.

In the aqueous pigment dispersion according to the present invention, the concentration of the pigment may be preferably from 0.5 to 50 wt %, more preferably from 0.5 to 30 wt % based on the dispersion although it depends on the kind of the pigment. On the other hand, the viscosity (25° C.) of the dispersion may be preferably from 1 to 50 mPa·s, preferably from 2 to 30 mPa·s. The viscosity of the aqueous pigment dispersion making use of the treated pigment, which is coated with the high-molecular dispersant according to the present invention, has excellent stability with time.

Water-based pigment dispersions can be obtained by using high-molecular dispersants as described above. These aqueous pigment dispersions can be used as coloring agents in conventionally-known paints, inks, coating formulations, stationery and toners. Specifically, these aqueous pigment dispersions can be used as coloring agents in water-based paints, oil-based paints, gravure inks, water-based flexographic inks, inkjet inks, inks for stationery, inks for writing instruments, coating formulations, colors for color filters, wet toners, chemical toners, and the like. Their contents vary depending on the pigment concentrations, and therefore, cannot be specified. They can be used at concentrations as much as needed to give desired color densities.

EXAMPLES

The present invention will next be described more specifically based on synthesis examples, examples and comparative examples, although the present invention shall not be limited at all by these examples. It is to be noted that all designations of "parts" and "%" in the subsequent description are on a weight basis.

Synthesis Example 1

Synthesis of High-Molecular Dispersant-1

To a reactor composed of a 1-L separable flask fitted with a stirrer, reflux condenser, thermometer and nitrogen inlet tube, diethylene glycol dimethyl ether (hereinafter called "diglyme") (241.5 parts), 2-iodo-2-cyanopropane (hereinafter called "CP-1") (6.2 parts), methyl methacrylate (hereinafter abbreviated as "MMA") (180 parts), acrylic acid (hereinafter abbreviated as "AA") (14.4 parts), azobisisobutyronitrile (hereinafter abbreviated as "AIBN") (5.2 parts), and iodosuccinimide (hereinafter abbreviated as "NIS") (0.1 parts) were added, followed by stirring while allowing nitrogen to flow. The reaction temperature was raised to 75° C., at which polymerization was conducted for 3 hours.

Three hours later, a portion of the polymerization mixture was sampled, and its solid content was measured. As a result, the solid content was found to be 42.0%, and therefore, the monomers were confirmed to be polymerized substantially in their entirety. Further, the molecular weight was measured by GPC. As a result, the number average molecular weight (hereinafter called "Mn") was found to be 5,000, and the polydispersity index (hereinafter called "PDI") was found to be 1.42. A polymer was, therefore, obtained with narrow molecular weight distribution and uniform molecular weight. The polymer showed no UV absorption (when measured at 254 nm wavelength; UV absorption will hereinafter means a measurement value at this wavelength), and no molecular weight was confirmed by a UV detector. The acid value of the polymer was 56.3 mgKOH/g.

To the polymerization mixture, a mixture of benzyl methacrylate (hereinafter abbreviated as "BzMA") (35.2 parts) and AIBN (0.3 parts) was added, followed by polymerization at the same temperature for 3 hours. When its solid content was measured, the solid content was found to be 48.9%, and therefore, the monomer was confirmed to be polymerized substantially in its entirety. Mn was 5,500, and PDI was 1.43. UV absorption by the benzyl group was confirmed, Mn and PDI as determined by UV absorption were 5,400 and 1.44, respectively. The molecular weight determined by GPC in the visible range was substantially the same as that determined in the UV range. As the molecular weight increased as a result of the linkage of the BzMA polymer block to the MMA/AA polymer block, the BzMA polymer block is considered to have block-copolymerized to the above-described MMA/AA polymer block.

The acid value of that block polymer (high-molecular dispersant) was 48.0 mgKOH/g. It is to be noted that the A block/[the A block+the B block] as calculated based on the used monomers×100=194.4/229.6×100=84.7(%). This value of the A block/[the A block+the B block] will apply equally to synthesis examples to be described hereinafter.

Potassium hydroxide (14.3 parts) and water (106.4 parts) were then added to the polymerization mixture to dissolve the high-molecular dispersant. The resulting solution was clear, and absolutely no precipitation of the high-molecular dispersant took place. Therefore, the BzMA polymer block was also dissolved without any precipitation. Subsequently, a reaction was conducted at 50° C. for 2 hours to dissociate the end iodine atom from the polymer. A solution of high-molecular dispersant-1 was obtained as described above. The solid content and pH of the solution were 41.2% and 9.8. Even when the solution was placed in a vessel and was left over, no precipitation of the polymer took place and the solution remained clear.

When the solution of high-molecular dispersant-1 was diluted with 10-fold water, a blue microdispersion was formed although it was substantially clear. The BzMA polymer block is, therefore, considered to have been dispersed as microparticles. When the amount of iodine ions in the solution was measured by an ion chromatograph, it was found to be 0.64%. Accordingly, the end iodine atom of the polymer was dissociated in its entirety.

Comparative Example 1

An experiment was conducted as in Synthesis Example 1 except that neither CP-1 nor NIS was used. In the polymerization of MMA/AA, the solid content reached 42.3% in 3 hours so that those monomers were polymerized substantially in their entirety. The molecular weight of the resulting polymer was then measured by GPC. As a result, Mn was 6,200, and PDI was 2.00. The polymer was not uniform in molecular weight, and was an ordinary radical polymerization polymer. After the above polymerization, a mixture of BzMA and AIBN was added further as the next monomer and polymerized as in Synthesis Example 1. The polymerization mixture was clear. Three hours later, its solid content was measured. The solid content was found to be 49.6%, and therefore, the monomer was confirmed to be polymerized substantially in its entirety. Its molecular weight was also measured. Mn was 6,800, and PDI was 2.02. Mn and PDI as determined by UV absorption were 5,000 and 2.48, respectively.

When an aqueous solution of potassium hydroxide was then added as in Synthesis Example 1, the polymerization mixture became clouded, and lots of insolubles were observed on a wall of the reactor. When a solution of the high-molecular dispersant was diluted with 10-fold water, the solution became clouded, and on a bottom part of a vessel, precipitates of fine particles were observed.

The molecular weight is not greater by only the molecular weight of the BzMA polymer block than the molecular weight of the MMA/AA polymer block, the molecular weight determined in the visible range and the molecular weight determined in the UV range are substantially different from each other, clouding took place upon addition of water, and precipitation or settling was observed when diluted with water. It is, therefore, indicated that water-insoluble homopolymer of BzMA existed and the MMA/AA polymer block and BzMA polymer block were not linked together in the form of a block polymer. Accordingly, the usefulness of the living radical polymerization employed in the present invention has been confirmed. The solution of the high-molecular dispersant solution will be called "the solution of comparative high-molecular dispersant-1". Its solid content and pH were 42.0% and 10.3. The solution was cloudy after neutralization. After left over in a vessel, however, the water-insoluble high-molecular dispersant precipitated out on the bottom wall of the vessel.

Comparative Example 2

Using a similar reactor as in Synthesis Example 1, diglyme (241.5 parts) was charged and was heated to 75° C. A mixed monomer solution prepared by mixing and homogenizing MMA (180 parts), AA (14.4 parts), BzMA (35.2 parts) and AIBN (5.6 parts) was provided in a separate vessel. To the reaction vessel, one thirds of the mixed monomer solution was added, and the remainder of the mixed monomer solution was added dropwise over 1.5 hours, followed by polymerization for 4.5 hours. The polymerization mixture was sampled, and its solid content was measured. The solid content was found to be 49.6%, and therefore, the monomers were confirmed to be reacted substantially in their entirety. When measured by GPC, Mn was 6,300, and PDI was 1.95. Mn and PDI as determined by UV absorption were 6,300 and 2.29, respectively. Therefore, Mn determined in the visible range and Mn determined in the UV range were identical to each other.

An aqueous alkaline solution formed of potassium hydroxide (14.3 parts) and water (106.4 parts) was then added to the polymerization mixture, whereby a clear solution of a high-molecular dispersant was obtained. When the solution was diluted with 10-fold water, the polymer was dissolved so that the solution became clear. The polymer was a conventional random polymer, and neither its molecular weight nor its structure was controlled. The random arrangement of carboxyl groups on the high-molecular dispersant, therefore, makes the high-molecular dispersant soluble evenly in water. The clear solution will be called "the solution of comparative high-molecular dispersant-2". Its solid content and pH were 41.9% and 10.2. Even when the solution of comparative high-molecular dispersant-2 was placed in a vessel and was left over, it remained clear.

Synthesis Examples 2 to 13

Solutions of block-polymer-type high-molecular dispersants-2 to -13 were prepared as in Synthesis Example 1, and are summarized in Tables 1 to 4. CP-1 was commonly used as an initiating compound. The use amount of CP-1 in each of Synthesis Examples 2 to 10 was the same as that in Synthesis Example 1, while the use amount of CP-1 in each of Synthesis Examples 11 to 13 was a half of its use amount in Synthesis Examples 2 to 10. When neutralized, the amount of the aqueous alkaline solution was a half of the amount of the organic solvent used in the polymerization. The abbreviations in Tables 1 to 4 have the following meanings.

(1) DPDM: dipropylene glycol dimethyl ether
(2) Diglyme: diethylene glycol dimethyl ether
(3) MMA: methyl methacrylate
(4) AIBN: azobisisobutyronitrile
(5) NIS: iodosuccinimide
(6) BzMA: benzyl methacrylate
(7) SI: succinimide
(8) IA: 2-t-butyl-4,6-dimethylphenol
(9) V-65: azobis(dimethylisovaleronitrile)
(10) LMA: lauryl methacrylate
(11) BMA: butyl methacrylate
(12) HEMA: 2-hydroxyethyl methacrylate
(13) CHMA: cyclohexyl methacrylate (14) AA: acrylic acid
(15) MAA: methacrylic acid
(16) DMAEMA: dimethylaminoethyl methacrylate
(17) PGMAc: propylene glycol monomethyl ether acetate
(18) IPA: isopropyl alcohol

TABLE 1

High-molecular dispersants produced as in Synthesis Example 1 except for variations in the molecular weight and acid value of the A block and the proportion of the B block

| High-molecular dispersants | | -2 | -3 | -4 |
|---|---|---|---|---|
| Polymerization temperature | | 75° C. | 70° C. | 70° C. |
| Polymerization solvent (parts) | | DPDM (277) | Diglyme (274.4) | Diglyme (200.3) |
| A block | Catalyst (parts) | SI (0.04) | IA (0.7) | NIS (0.1) |
| | Radical generator (parts) | AIBN (5.2) | V-65 (7.9) | V-65 (7.9) |
| | Monomer composition (parts) | MMA/AA = 180/14.4 | MMA/AA = 160/28.8 | MMA/AA = 102/13 |
| | Mn | 4,900 | 4,400 | 2,900 |
| | PDI | 1.41 | 1.52 | 1.38 |
| | Acid value (mgKOH/g) | 57.7 | 116.2 | 87.0 |
| | Solid content (%) | 36.2 | 35.9 | 32.0 |
| B block | Monomer (parts) | BzMA (70.4) | BzMA (70.4) | BzMA (70.4) |
| | Radical generator (parts) | AIBN (0.7) | V-65 (0.7) | V-65 (0.7) |
| Mn | | 6,100 | 5,400 | 4,200 |
| PDI | | 1.46 | 1.55 | 1.42 |
| Acid value (mgKOH/g) | | 42.3 | 86.0 | 54.2 |
| Neutralizing agent (parts) | | KOH (14.3) | KOH (26.6) | KOH (13.0) |
| Solid content (%) | | 40.9 | 42.7 | 41.0 |
| External appearance | | Pale yellow, clear | Pale yellow, clear | Pale yellow, clear |
| External appearance after diluted with 10-fold water | | Semi-clear blue microdispersion | Slightly blue microdispersion | Blue, semi-clear |

TABLE 2

High-molecular dispersants produced as in Synthesis Example 1 except for variations in the acid value and molecular weight of the A block and the kind of the B block

| High-molecular dispersants | -5 | -6 | -7 |
|---|---|---|---|
| Polymerization temperature | 70° C. | 70° C. | 70° C. |
| Polymerization solvent (parts) | DPDM (250) | Diglyme (353) | Diglyme (270) |

TABLE 2-continued

High-molecular dispersants produced as in Synthesis Example 1 except for variations
in the acid value and molecular weight of the A block and the kind of the B block

| | High-molecular dispersants | -5 | -6 | -7 |
|---|---|---|---|---|
| A block | Catalyst (parts) | Phosphorus triiodide (0.16) | IA (0.7) | NIS (0.1) |
| | Radical generator (parts) | Lauroyl peroxide (12.7) | V-65 (7.9) | V-65 (7.9) |
| | Monomer composition (parts) | MMA/AA = 180/14.4 | MMA/AA = 288/23 | MMA/AA = 160/28.8 |
| | Mn | 4,800 | 6,600 | 4,500 |
| | PDI | 1.45 | 1.53 | 1.45 |
| | Acid value (mgKOH/g) | 57.2 | 56.9 | 117.5 |
| | Solid content (%) | 42.0 | 45.2 | 37.5 |
| B block | Monomer (parts) | LMA (35.6) | BMA/MMA (22.7/4) | BzMA/HEMA (56.3/10.4) |
| | Radical generator (parts) | Lauroyl peroxide (0.35) | V-65 (0.26) | V-65 (0.66) |
| Mn | | 5,200 | 7,200 | 5,700 |
| PDI | | 1.48 | 1.54 | 1.56 |
| Acid value (mgKOH/g) | | 49.0 | 53.2 | 90.4 |
| Neutralizing agent (parts) | | Diethanolamine (26.8) | Sodium hydroxide (15.4) | Potassium hydroxide (26.6) |
| Solid content (%) | | 42.3 | 41.2 | 42.4 |
| External appearance | | Pale yellow, clear | Pale yellow, clear | Pale yellow, clear |
| External appearance after diluted with 10-fold water | | Blue microdispersion | Slightly blue microdispersion | Substantially clear |

TABLE 3

High-molecular dispersants produced as in Synthesis Example 1 except for variations
in the composition of the A block and the composition of the B block

| | High-molecular dispersants | -8 | -9 | -10 |
|---|---|---|---|---|
| Polymerization temperature | | 70° C. | 70° C. | 75° C. |
| Polymerization solvent (parts) | | Diglyme (266) | DPDM (370) | Diglyme (278) |
| A block | Catalyst (parts) | IA (0.7) | Diiodohydantoin (0.78) | NIS (0.45) |
| | Radical generator (parts) | V-65 (7.9) | V-65 (4.0) | AIBN (5.2) |
| | Monomer composition (parts) | MMA/CHMA/AA = 120/67.2/28.8 | MMA/BMA/AA = 120/99.4/36 | MMA/MAA = 168/27.5 |
| | Mn | 5,200 | 8,600 | 5,000 |
| | PDI | 1.45 | 1.54 | 1.48 |
| | Acid value (mgKOH/g) | 101.0 | 108.6 | 108.0 |
| | Solid content (%) | 42.5 | 35.2 | 40.9 |
| B block | Monomer (parts) | BzMA (35.2) | BzMA (105.6) | BzMA (70.4) |
| | Radical generator (parts) | V-65 (0.3) | V-65 (1.0) | AIBN (0.7) |
| Mn | | 5,800 | 9,900 | 6,200 |
| PDI | | 1.47 | 1.63 | 1.68 |
| Acid value (mgKOH/g) | | 89.3 | 77.4 | 80.3 |
| Neutralizing agent (parts) | | Potassium hydroxide (26.6) | Potassium hydroxide (31.8) | Unneutralized |
| Solid content (%) | | 43.2 | 43.2 | 49.5 |
| External appearance | | Pale yellow, clear | Pale yellow, clear | Pale yellow, clear |
| External appearance after diluted with 10-fold water | | Bluish white, semi-clear | Bluish white, semi-clear | Water-insoluble |

TABLE 4

High-molecular dispersants produced as in Synthesis Example 1 except that the molecular
weight and acid value of the A block were varied and the B block contained CHMA units

| | High-molecular dispersants | -11 | -12 | -13 |
|---|---|---|---|---|
| Polymerization temperature | | 65° C. | 65° C. | 65° C. |
| Polymerization solvent (parts) | | PGMAc (150) | Diglyme (157) | Diglyme/IPA = 80/80 |
| A block | Catalyst (parts) | SI (0.04) | SI (0.04) | IA (0.4) |
| | Radical generator (parts) | V-65 (6.0) | V-65 (6.0) | V-65 (6.0) |
| | Monomer composition (parts) | MMA/AA = 65/25 | MMA/AA = 56/32 | MMA/AA = 84/11 |
| | Mn | 6,100 | 5,800 | 4,400 |
| | PDI | 1.74 | 1.79 | 1.58 |
| | Acid value (mgKOH/g) | 216.2 | 283.4 | 121.3 |
| | Solid content (%) | 40.0 | 38.6 | 41.0 |
| B block | Monomer (parts) | CHMA (51) | CHMA/HEMA (40/20) | CHMA/DMAEMA (35/16) |
| | Radical generator (parts) | V-65 (0.35) | V-65 (0.3) | V-65 (0.2) |

TABLE 4-continued

High-molecular dispersants produced as in Synthesis Example 1 except that the molecular weight and acid value of the A block were varied and the B block contained CHMA units

| High-molecular dispersants | -11 | -12 | -13 |
|---|---|---|---|
| Mn | 7,600 | 8,200 | 5,200 |
| PDI | 1.85 | 1.82 | 1.73 |
| Acid value (mgKOH/g) | 135.0 | 168.5 | 58.7 |
| Neutralizing agent (parts) | Unneutralized | 28% aqueous ammonia (32) | Unneutralized |
| Solid content (%) | 48.7 | 40.2 | 48.1 |
| External appearance | Pale yellow, clear | White with clear sensation | Pale yellow, clear; no fluidity; fluidized when heated |
| External appearance after diluted with 10-fold water | — | Cloudy emulsion | — |

Synthesis Example 14

Synthesis of High-Molecular Dispersant-14

Using a similar reactor as in Synthesis Example 1, diglyme (227 parts), CP-1 (6.2 parts), MMA (84 parts), AA (13.7 parts), AIBN (5.2 parts), and NIS (0.45 parts) were combined, followed by stirring while allowing nitrogen to flow. The reaction temperature was raised to 75° C., at which polymerization was conducted for 3 hours. Three hours later, a portion of the polymerization mixture was sampled, and its solid content was measured. As a result, the solid content was found to be 19.2%, and therefore, the monomers were confirmed to be polymerized substantially in their entirety. Further, the molecular weight was measured by GPC. As a result, Mn was found to be 2,300, and PDI was found to be 1.38. The acid value of the polymer was 104.2 mgKOH/g.

To the polymerization system, a mixture of BzMA (70.4 parts) and AIBN (0.7 parts) was added, followed by polymerization at the same temperature for 3 hours. When its solid content was measured, the solid content was found to be 38.5%, and therefore, the monomer was confirmed to be polymerized substantially in its entirety. Mn was 4,300, and PDI was 1.45. MMA (84 parts) and AA (13.7 parts) were added further, followed by polymerization for 3 hours. The solid content was 48.6%, Mn was 6,100, and PDI was 1.86. The acid value of the polymer was measured. As a result, the acid value was found to be 76.5 mgKOH/g. To the polymerization mixture, sodium hydroxide (21.7 parts) and water (117 parts) were then added to neutralize the polymer. The resulting solution was clear, and absolutely no precipitation took place. Therefore, the BzMA polymer block was also dissolved without any precipitation. Subsequently, a reaction was conducted at 50° C. for 2 hours to dissociate the end iodine atom from the polymer.

A solution of the high-molecular dispersant-14 was obtained as described above. The solid content and pH of the solution were 41.2% and 9.5. Even when the solution was placed in a vessel and was left over, no precipitation of the polymer took place and the solution remained clear. When the solution of the high-molecular dispersant-14 was diluted with 10-fold water, a blue microdispersion was formed although it was substantially clear. The BzMA polymer block was, therefore, considered to be dispersed as microparticles. When the amount of iodine ions in the solution was measured by an ion chromatograph, it was found to be 0.57%. Accordingly, the end iodine atom of the polymer was dissociated in its entirety. The polymer was a triblock polymer of the A-B-C type.

Synthesis Example 15

Synthesis of High-Molecular Dispersant-15

Using a similar reactor as in Synthesis Example 1, diglyme (270.1 parts), iodine (303 parts), azobis(methoxydimethylvaleronitrile) (hereinafter abbreviated as "V-70") (14.8 parts), di-t-butylhydroxytoluene (hereinafter abbreviated as "BHT") (0.66 parts), and BzMA (105.6 parts) were combined. While allowing nitrogen to flow, the contents were heated to 40° C. and then polymerized for 6.5 hours. Three hours later, the brown color of iodine disappeared, and the polymerization mixture turned into a lemon color. This indicates that V-70 as a radical generator decomposed and the resulting radical reacted with iodine into an organoiodide as a polymerization initiating compound in the present invention. Subsequently, a portion of the polymerization mixture was sampled, and its solid content was measured. As a result, the solid content was found to be 21.1% and the yield was 67%. The molecular weight was measured by GPC. As a result, Mn was found to be 2,700, and PDI was found to be 1.20.

To the reaction mixture, a mixture of MMA (120 parts), MAA (25.8 parts) and V-70 (0.74 parts) was added, followed by polymerization for 4.5 hours. A portion of the polymerization mixture was sampled, and its solid content was measured. The solid content was found to be 48.3%, and therefore, the monomers were confirmed to be polymerized substantially in their entirety. The A polymer contained BzMA which was added as a monomer for the B polymer but did not polymerize. Calculated from the yield, the A polymer had the following composition: MMA/MAA/BzMA=66.4/14.3/19.3 (weight ratio). Mn and PDI of the thus-obtained block polymer were 6,000 and 1.44, respectively. Its acid value was 67.0 mgKOH/g.

Diethylene glycol monobutyl ether (hereinafter abbreviated as "BDG") (135.6 parts) was then added. Further, a mixture of sodium hydroxide (7.2 parts) and water (128.4 parts) was added to neutralize the polymer. The resulting solution was clear, and absolutely no precipitation took place. Subsequently, a reaction was conducted at 50° C. for 2 hours to dissociate the end iodine atom from the polymer. The solid content was 34.4%.

This polymer was an A-B block polymer, which was obtained by polymerizing the A polymer as a water-soluble polymer after polymerization of the hydrophobic B polymer, and further, which used methacrylic acid. This polymer is also an A-B polymer in which the molecular weight of the B polymer was relatively large.

Synthesis Examples 16 to 24

Solutions of high-molecular dispersants-16 to -24, each of which was an A-B block polymer obtained by first obtaining a B polymer and then polymerizing an A polymer containing methacrylic acid units, were prepared as in Synthesis Example 15, and are summarized in Tables 5 to 7. It is to be noted that in each of Synthesis Examples 16 to 24, V-70, iodine and diglyme were used and the amount of the solvent was adjusted to control the solid content to 50% after the formation of the block polymer, as in Synthesis Example 15. Further, the composition of the A block in each block polymer was expressed as a composition in terms of weight ratio by calculating the remainder of the monomer or monomers for the corresponding B block from the yield of the B block, and the acid value of the A block was calculated from the composition.

TABLE 5

High-molecular dispersants produced as in Synthesis Example 15 except for variations in the composition of the B block

| High-molecular dispersants | | -16 | -17 | -18 |
|---|---|---|---|---|
| Polymerization temperature | | 45° C. | 40° C. | 45° C. |
| B block | Catalyst (parts) | BHT (0.66) | SI (0.15) | NIS (0.068) |
| | Monomer composition (parts) | CHMA (105.6) | BzMA/CHMA (52.8/50.4) | BMA/2EHMA (42.6/59.4) |
| | Mn | 2,300 | 2,500 | 2,800 |
| | PDI | 1.26 | 1.26 | 1.31 |
| | Yield (%) | 73 | 80 | 90 |
| A block | Added monomer composition (parts) | MMA/MAA = 120/25.8 | MMA/MAA = 120/25.8 | MMA/MAA = 120/25.8 |
| | Composition (parts) | MMA/MAA/CHMA = 69/15/16 | MMA/MAA/(CHMA + BzMA) = 69.7/15/15.3 | MMA/MAA/(BMA + EHMA) = 77/16.5/6.5 |
| | Radical generator (parts) | V-70 (0.72) | V-70 (0.72) | V-70 (0.72) |
| | Acid value (mgKOH/g) | 97.8 | 97.8 | 107.6 |
| Mn | | 5,600 | 5,700 | 5,600 |
| PDI | | 1.43 | 1.40 | 1.35 |
| Acid value (mgKOH/g) | | 66.5 | 64.3 | 67.0 |
| Neutralizing agent | | Sodium hydroxide | Sodium hydroxide | Sodium hydroxide |
| Solid content (%) | | 34.6 | 35.0 | 34.9 |
| External appearance | | Pale yellow, clear | Pale yellow, clear | Pale yellow, clear |
| External appearance after diluted with 10-fold water | | Slightly blue, clouded, semi-clear | Slightly blue, clouded, semi-clear | Slightly blue, clouded, semi-clear |

TABLE 6

High-molecular dispersants varied in the molecular weight of the B block and the acid value of the A block

| High-molecular dispersants | | -19 | -20 | -21 |
|---|---|---|---|---|
| Polymerization temperature | | 40° C. | 40° C. | 40° C. |
| B block | Catalyst (parts) | BHT (0.66) | BHT (0.66) | BHT (0.66) |
| | Monomer composition (parts) | CHMA (105.6) | CHMA (151.2) | CHMA (176.4) |
| | Mn | 2,000 | 3,300 | 3,800 |
| | PDI | 1.24 | 1.34 | 1.37 |
| | Yield (%) | 73 | 81 | 87 |
| A block | Added monomer composition (parts) | MMA/MAA = 96/20.6 | MMA/MAA = 75/40 | MMA/MAA = 75/40 |
| | Composition (parts) | MMA/MAA/CHMA = 66.2/14.2/19.6 | MMA/MAA/CHMA = 52.6/27.4/20 | MMA/MAA/CHMA = 54.7/28.2/17.1 |
| | Radical generator (parts) | V-70 (0.62) | V-70 (0.60) | V-70 (0.60) |
| | Acid value (mgKOH/g) | 92.6 | 178.8 | 184.0 |
| Mn | | 4,700 | 5,400 | 6,400 |
| PDI | | 1.35 | 1.37 | 1.37 |
| Acid value (mgKOH/g) | | 58.9 | 95.4 | 85.2 |
| Neutralizing agent | | Sodium hydroxide | Sodium hydroxide | Unneutralized |
| Solid content (%) | | 36.8 | 36.5 | 48.7 |
| External appearance | | Pale yellow, clear | Pale yellow, clear | Brown, clear |
| External appearance after diluted with 10-fold water | | Slightly blue, clouded, semi-clear | Slightly blue, clouded, semi-clear | — |

TABLE 7

High-molecular dispersants varied in the acid value of the A block with the B block being kept unchanged

| High-molecular dispersants | | -22 | -23 | -24 |
|---|---|---|---|---|
| Polymerization temperature | | 40° C. | 40° C. | 40° C. |
| B block | Catalyst (parts) | BHT (0.66) | BHT (0.66) | BHT (0.66) |
| | Monomer composition (parts) | CHMA (176.4) | CHMA (176.4) | CHMA (176.4) |
| | Mn | 3,900 | 3,800 | 3,900 |

TABLE 7-continued

High-molecular dispersants varied in the acid value of the A block with the B block being kept unchanged

| High-molecular dispersants | | -22 | -23 | -24 |
|---|---|---|---|---|
| | PDI | 1.38 | 1.32 | 1.37 |
| | Yield (%) | 85 | 90 | 81 |
| A block | Added monomer composition (parts) | MMA/MAA = 65/25.8 | MMA/MAA = 84/18.2 | MMA/MAA = 90/12.9 |
| | Composition (parts) | MMA/MAA/CHMA = 58.9/20.2/20.7 | MMA/MAA/CHMA = 70.1/15.2/14.7 | MMA/MAA/CHMA = 66/9.5/24.5 |
| | Radical generator (parts) | V-70 (0.62) | V-70 (0.60) | V-70 (0.60) |
| | Acid value (mgKOH/g) | 131.8 | 99.2 | 62.0 |
| Mn | | 6,100 | 5,600 | 6,100 |
| PDI | | 1.37 | 1.33 | 1.41 |
| Acid value (mgKOH/g) | | 60.1 | 42.4 | 31.3 |
| Neutralizing agent | | Unneutralized | Unneutralized | Unneutralized |
| Solid content (%) | | 48.3 | 50.2 | 48.9 |
| External appearance | | Brown, clear | Brown, clear | Brown, clear |

Application Example 2

Aqueous Blue Pigment Dispersion-1

The high-molecular dispersant-1 (170 parts) obtained in Synthesis Example 1, diethylene glycol monobutyl ether (70 parts) and deionized water (388 parts) were mixed into a homogeneous solution. The solution was clear and free of turbidity. To the solution, a paste (solid content: 35%) of copper phthalocyanine blue ("CYANINE BLUE KBM", product of Dainichi Seika Color & Chemicals Mfg. Co., Ltd.; 1,000 parts) as a blue pigment was added, followed by deflocculation for 30 minutes in a disper mixer to prepare a mill base.

After the pigment was fully dispersed by using a medium-containing horizontal disperser, deionized water (316 parts) was added to the resulting mill base to obtain an aqueous pigment dispersion having a pigment content of 18%. Deionized water (5,000 parts) was then poured into the mill base obtained as described above, and with stirring at high speed, 5% hydrochloric acid was added dropwise to cause the high-molecular dispersant to precipitate. In the course of the dropwise addition, the pH was 9.5 at the beginning, and owing to the addition of the acid, was lowered to 2.1. The aqueous pigment dispersion was then filtered, and the resulting filter cake was thoroughly washed with deionized water to obtain a pigment paste having a solid content of 30.5%.

To the pigment paste (100 parts), a solution of sodium hydroxide (6.4 parts) in water (46.1 parts) was added, followed by mixing under stirring. The resulting mixture was then fully stirred and dispersed in the above-described, medium-containing horizontal disperser. At that time, the particle size of the pigment was 101.3 nm, and the viscosity and pH of the dispersion were 3.48 mPa·s and 8.9. Iodine ions were measured by an ion chromatograph, but no iodine ions were detected. An aqueous blue pigment dispersion-1 was obtained as described above. When the dispersion was stored at 70° C. for 4 days, the particle size of the pigment was 101.7 nm, and the viscosity of the dispersion was 3.38 mPa·s. Therefore, the storage stability of the dispersion was good.

A small portion of the aqueous pigment dispersion was next placed in an aluminum cup, and was left over for 3 hours in a vacuum drier controlled at 50° C. to obtain a dried film. When deionized water was dropped onto the dried film, the film was dissolved upon contact with the water. When the solution obtained after the dissolution was observed under a microscope, the solution was free of coarse particles, and all particles had been dissolved. Therefore, even when the aqueous pigment dispersion according to the present invention is once dried, its dried product is hence good in re-dispersibility. In this dispersion, the high-molecular dispersant is considered to have capsulated on the pigment, and therefore, self-dispersibility is considered to have imparted to the pigment.

Using the comparative high-molecular dispersants of Comparative Examples 1 and 2, similar experiments were conducted in a similar manner as described above. In addition, the mill base before the precipitation treatment in Example 1 was adjusted to have a similar solid content, and a similar re-dispersibility test was conducted. The results are shown together with the results of Example 1 in Table 8.

TABLE 8

| | Particle size (nm) | | | Change in viscosity (mPa · s) | | | Re-dispersibility | |
|---|---|---|---|---|---|---|---|---|
| | After dispersion | After storage | Evaluation | After dispersion | After storage | Evaluation | Changes | Evaluation |
| Example 1 | 101.3 | 101.7 | A | 3.48 | 3.38 | A | Quickly dissolved | A |
| Mill base of Example 1 | 106.5 | 146.2 | D | 3.56 | 5.92 | C | Partially dissolved with separation of film | C |
| Comp. Ex. 1 | 115.3 | 130.0 | C | 5.82 | 5.77 | B | Film separated | D |
| Comp. Ex. 2 | 130.2 | 153.7 | D | 6.34 | 8.30 | C | Film separated | D |

Evaluation Standards
Similar evaluation standards will hereinafter be applied to similar test results.
Particle Size
  A: Rate of change<+5%
  B: ±5%≤Rate of change<±10%
  C: ±10%≤Rate of change<±15%
  D: ±15%≤Rate of change
Change in Viscosity
  A: Low viscosity, rate of change<±10%
  B: High viscosity, rate of change<±10%
  C: Low viscosity, ±10%≥rate of change
  D: High viscosity, ±10%≥Rate of change
Re-Dispersibility
  A: Quickly dissolved
  B: Partially dissolved with separation of film
  C: Partially dissolved with dissolution of film
  D: Dissolved with separation of film In Comparative Example 1, an MMA/AA copolymer of high acid value existed in the dispersant, and therefore, the dispersion of the pigment proceeded to afford an aqueous pigment dispersion with the pigment being dispersed to a certain degree of fineness. With respect to its re-dispersibility, however, a dried film was observed to separate as it was. When observed under a microscope, coagulated particles and a film-shaped material were observed. The high-molecular dispersant used in Comparative Example 2 had a low acid value, and the dispersion of the pigment was insufficient in the resultant dispersion. Similar to Comparative Example 1, the re-dispersibility was poor. In the mill base of Example 1, the high-molecular dispersant had not capsulated the pigment completely, and the high-molecular dispersant separated from the pigment. Therefore, the performance of the dispersant is not considered to have been fully exhibited.

As in Example 1, a similar operation was conducted on PY-74 as a yellow pigment, PR-122 as a magenta pigment and carbon black as a black pigment, respectively, whereby an aqueous yellow pigment dispersion, aqueous magenta pigment dispersion and aqueous black pigment dispersion were obtained. Described specifically, for the aqueous yellow pigment dispersion, "SEIKA FAST YELLOW A3" (product of Dainichi Seika Color & Chemicals Mfg. Co., Ltd.) was dispersed with the high-molecular dispersant-2 as a high-molecular dispersant; for the aqueous magenta pigment dispersion, "CHROMOFINE MAGENTA 6887" (product of Dainichi Seika Color & Chemicals Mfg. Co., Ltd.) was dispersed with the high-molecular dispersant-7; and for the aqueous black pigment dispersion, "MB-1000" (product of Mitsubishi Chemical Corporation) was dispersed with the high-molecular dispersant-5. These dispersions will be called "aqueous yellow pigment dispersion-1", "aqueous red pigment dispersion-1" and "aqueous black pigment dispersion-1", respectively. Using the high-molecular dispersant of Comparative Example 2, the red pigment was also dispersed to obtain an aqueous red pigment dispersion-2. The results of a storage stability test of those dispersions and the results of a re-dispersibility test of their dried films are shown in Table 9.

TABLE 9

|  | Particle size (nm) | | | Change in viscosity (mPa·s) | | | Re-dispersibility | |
| --- | --- | --- | --- | --- | --- | --- | --- | --- |
|  | After dispersion | After storage | Evaluation | After dispersion | After storage | Evaluation | Changes | Evaluation |
| Aqueous yellow pigment dispersion-1 | 106 | 116 | A | 2.93 | 2.83 | A | Dissolved | A |
| Aqueous red pigment dispersion-1 | 118 | 117 | A | 3.97 | 3.82 | A | Dissolved | A |
| Aqueous red pigment dispersion-2 | 130 | 161 | D | 5.89 | 7.65 | D | Film separated | D |
| Aqueous black pigment dispersion-1 | 80 | 79 | A | 3.11 | 2.80 | A | Dissolved | A |

As aqueous yellow pigment dispersion-1, aqueous red pigment dispersion-1 and aqueous black pigment dispersion-1, the aqueous pigment dispersions of the respective colors were obtained with good storage stability and very good dried-film re-dispersibility like the aqueous blue pigment dispersion-1. As described above in the example, it has been found possible to obtain aqueous pigment dispersions which can form dried coatings with very good re-dispersibility, to say nothing of good storage stability. A further experiment was conducted by changing the high-molecular dispersant from the high-molecular dispersant-7 to the high-molecular dispersant-12 in the aqueous red pigment dispersion-1. Similar results were obtained.

Figure 2:
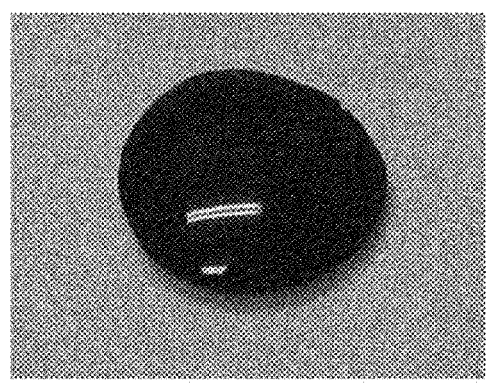
FIG. 2 shows the films after addition of water (left—Example, right—Comparative Example 2).
Figure 2:
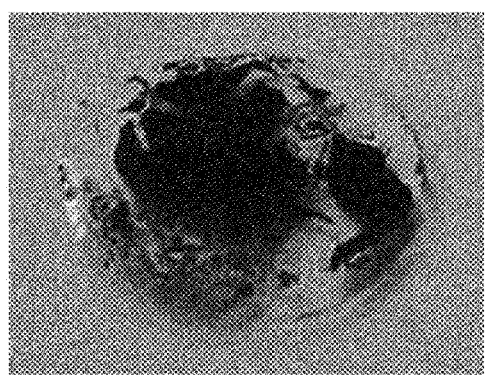
Figure 3:
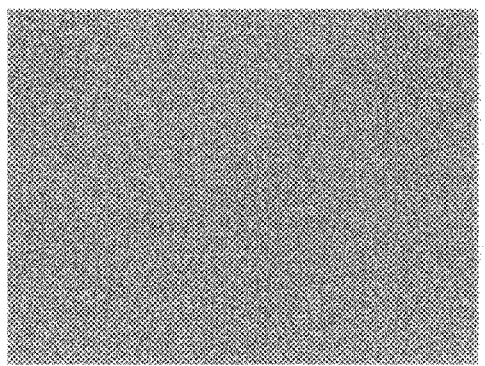
FIG. 3 shows micrographs of the films after addition of water (left—Example, right—Comparative Example 2).
Figure 3:
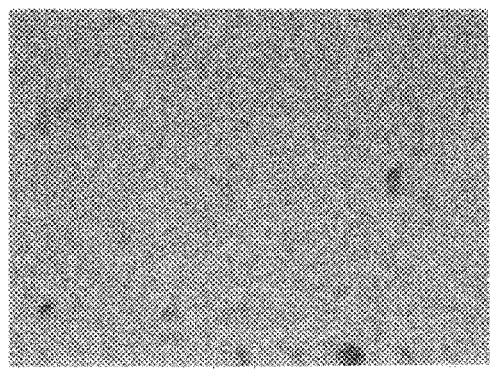

As examples, images of a dried film of the aqueous red pigment dispersion-1 and that of the aqueous red pigment dispersion-2, which was obtained by using the high-molecular dispersant of Comparative Example 2, in a re-dispersibility test of the dried films are shown in FIG. 1, FIG. 2 and FIG. 3. FIG. 1 shows films after drying, FIG. 2 shows the conditions of the respective films when water was added, and FIG. 3 shows the films as observed under a microscope when water was added. The film obtained by using the high-molecular dispersant according to the present invention has been confirmed to have readily dissolved.

When these dispersions are used as water-based pigment inks for stationery, the above-described good re-dispersibility is considered to prevent drying of pen points and, even when the pen points become dry, to permit writing again once the pen points are brought into contact with water. When they are used as inkjet inks, on the other hand, the above-described good re-dispersibility is considered to prevent drying of print heads and, even when the print heads become dry, to permit readily cleaning them up again with a washing solution. Accordingly, these dispersions are very useful.

Example 2

Aqueous Blue Pigment Dispersion-2

Dispersion treatment was conducted as in Example 1 except that the high-molecular dispersant-1 (170 parts) was replaced by the high-molecular dispersant-3 (41 parts) and in the dispersion of the pigment before the precipitation of the dispersant, the dispersion was performed by replacing the disperser with an ultrasonic disperser. The ultrasonic dispersion treatment was conducted by stirring a mill base with a magnetic stirrer, defoaming the mill base for 15 minutes in an ultrasonic defoaming apparatus, and after a break of 1 minute, applying ultrasonic waves for 15 minutes from the ultrasonic disperser, the output of which was 1,200 Hz, while externally cooling a vessel with ice.

An aqueous blue pigment dispersion-2 was obtained as described above. In this example, the high-molecular dispersant was used in a smaller amount relative to the pigment. In Example 1, the dispersant was used in an amount of 20% based on the pigment. In Example 2, however, the amount of the dispersant was as small as 5% based on the pigment. Using the high-molecular dispersants of Comparative Examples 1 and 2, ultrasonic dispersion treatment was also conducted likewise. The aqueous pigment dispersions obtained as described above were also tested for storage stability and dried-film re-dispersibility as in Example 1. The results are shown in Table 10.

TABLE 10

| | Particle size (nm) | | | Change in viscosity (mPa·s) | | | Re-dispersibility | |
|---|---|---|---|---|---|---|---|---|
| | After dispersion | After storage | Evaluation | After dispersion | After storage | Evaluation | Changes | Evaluation |
| Example 2 | 115 | 114 | A | 3.31 | 3.10 | A | Dissolved | A |
| Comp. Ex. 1 | 130 | 205 | D | 4.97 | 10.2 | D | Film separated | D |
| Comp. Ex. 2 | 150 | 230 | D | 5.98 | Gelled | D | Film separated | D |

As described above, it was surprisingly possible to obtain the dispersion which had high dispersion stability and, even when dried, was re-dispersible in water despite the very small use amount of the high-molecular dispersion relative to the pigment. This may be attributable to the coating of the pigment particles with the high-molecular dispersant or the deposition of the high-molecular dispersant on the pigment particles. In each of Comparative Examples 1 and 2, the conventional pigment dispersion method was used, the dispersant was insufficient relative to the pigment, the dispersion lacked of stability, and the re-dispersibility of the dried film was not good. By replacing the high-molecular dispersant in the aqueous blue pigment dispersion-2 with the triblock polymers of the high-molecular dispersant-10 and high-molecular dispersant 14 of high acid value, respectively, dispersion was conducted. As a result, similar results were obtained.

Using a yellow pigment, magenta pigment and black pigment, aqueous pigment dispersions were obtained, respectively, as in Example 1. Described specifically, the high-molecular dispersant-4 was used to obtain the aqueous yellow pigment dispersion as an aqueous yellow pigment dispersion-2; the high-molecular dispersant-9 was used to obtain the aqueous magenta pigment dispersion as an aqueous magenta pigment dispersion-3; and the high-molecular dispersant-6 was used to obtain the aqueous black pigment dispersion as an aqueous black pigment dispersion-2. Those pigment dispersions were equipped with similar storage stability and dried-film re-dispersibility as demonstrated in the above-described test.

Example 3

Aqueous White Pigment Dispersion

Titanium oxide ("R-930", product of Ishihara Sangyo Kaisha Ltd.) (20 parts), the high-molecular dispersant-8 (18.5 parts) and water (61.5 parts) were placed in a 250-mL plastic bottle, and were dispersed together with 1-mm zirconia beads for 4 hours by a paint conditioner. The particle size of the pigment in the resulting dispersion was 236 nm, and its maximum particle size was 1.51 μm. In a similar manner as in Example 1, the high-molecular dispersant was caused to precipitate, and the coated titanium oxide was collected by filtration. The solid content of the resulting paste was 28.7%.

To the pigment paste (100 parts), 28% aqueous ammonia (2.4 parts) and water (3.6 parts) were added, and the resulting mixture was stirred by a high-speed disper mixer. As a result, the high-molecular dispersant was readily dissolved to disperse the titanium oxide so that an aqueous white pigment dispersion was obtained. The particle size of the pigment in the dispersion was measured. The particle size was found to be 241 nm which was close to the particle size at the time of the dispersion, and therefore, an aqueous pigment dispersion was obtained with ease. For the sake of comparison, the mill base obtained by the paint conditioner as described above was diluted with water to have a similar pigment content as the above-described aqueous white pigment dispersion. This will be called "the comparative aqueous white pigment dispersion".

Both of the pigment dispersions were left over at room temperature for 1 week to test the degrees of pigment settling. As a result, with the aqueous white pigment dispersion, no supernatant was observed and precipitates were slightly observed on a bottom part. These results are considered to be effects brought about owing to the coating of the pigment surfaces with the high-molecular dispersant. With the comparative aqueous white pigment dispersion, on the other hand, a clear supernatant and lots of settlings were observed. By changing the dispersant to the high-molecular dispersant-12 having hydroxyl groups, dispersion was also conducted likewise. Results similar to those of the aqueous white pigment dispersion were obtained.

Example 4

Aqueous Green Pigment Dispersion-1

A commercial halogenated phthalocyanine green pigment (C.I.P.G. 36) (100 parts), monosulfonated copper phthalocyanine (5 parts), diethylene glycol (200 parts) and common salt (700 parts) were charged into a 3-L kneader. The kneader was controlled to maintain its temperature at from 100° C. to 120° C. When the temperature reached that temperature range, the high-molecular dispersant-10 (40 parts) was added, followed by milling for 8 hours. The resulting kneaded mixture (800 parts) was then charged into water (2,000 parts), and the thus-obtained mixture was stirred at high speed for 4 hours. Filtration and washing were then conducted to obtain a water-based paste of the green pigment (pigment content: 29.3%).

To the water-based paste (100 parts), 28% aqueous ammonia (0.6 parts) and water (94.7 parts) were added, followed by dispersion in a medium-containing horizontal disperser as in Example 1. The particle size of the pigment in the dispersion and the viscosity of the dispersion were 89 nm and 2.66 mPa·s, respectively, at that time. When the dispersion was similarly subjected to a storage test, the particle size of the pigment and the viscosity of the dispersion were found to be 82 nm and 2.58 mPa·s, respectively. Therefore, the dispersion was good in storage stability. In a re-dispersibility test of a dried film, the dried film showed good re-dispersibility, and was re-dispersed well. This dispersion will be called an "aqueous green pigment dispersion-1".

By changing the dispersant to the high-molecular dispersant-13 having amino groups, dispersion was conducted.

(0.67 parts) were mixed, neutralized, converted into an aqueous solution, and then dispersed by the disperser. As the resulting pigment dispersion had a pigment content of 17%, water was added to the pigment dispersion to obtain a pigment dispersion having a pigment content of 14%. This pigment dispersion will be called an "aqueous red pigment dispersion-4".

Further, upon dilution of the pigment to 14% after the dispersion, the pigment content was also adjusted by adding BDG in place of water. The resulting dispersion was a pigment dispersion that abundantly contained BDG as an organic solvent. This pigment dispersion will be called an "aqueous red pigment dispersion-5".

Using the high-molecular dispersant-18, dispersion was conducted likewise to obtain an aqueous red pigment dispersion-6 and an aqueous red pigment dispersion-7 that abundantly contained BDG.

Those four aqueous red pigment dispersions were stored at 70° C. for 1 day and 7 days in a similar manner as described above. Changes in their particle sizes and viscosities are summarized in Table 11.

TABLE 11

| Aqueous red pigment dispersions | Particle size (nm) | | | | Change in viscosity (mPa · s) | | | |
|---|---|---|---|---|---|---|---|---|
| | After dispersion | Day 1 | Day 7 | Evaluation | After dispersion | Day 1 | Day 7 | Evaluation |
| -4 | 101.0 | 101.7 | 101.3 | A | 2.46 | 2.29 | 2.24 | A |
| -5 | 102.2 | 104.3 | 102.5 | A | 3.89 | 3.54 | 3.47 | A |
| -6 | 101.2 | 103.9 | 107.8 | A | 2.82 | 2.67 | 2.52 | A |
| -7 | 104.3 | 201.0 | 340.0 | D | 3.95 | 7.89 | Gelled | D |

Similar results were obtained. As storage stability, the dispersion had stability as high as a viscosity change of less than 5% even after stored at 70° C. for 1 week. This high stability is considered to be attributable to the exhibition of an advantageous effect by a high degree of encapsulation as a result of ion bonding between sulfonic groups of the synergist on the pigment surfaces and the amino groups of the high-molecular dispersant.

Example 5

Aqueous Red Pigment Dispersion-4

The high-molecular dispersant-15 (25.3 parts) and BDG (60.0 parts) were mixed into a clear aqueous solution. When the solution was added to a water-based paste (solid content: 29.4%; 204 parts) of microparticulated PR-122 (average particle size: 106 nm), the water-based paste was provided with fluidity. Stirring was then conducted in a dissolver. As in Example 1, the resulting mixture was dispersed together with the milling medium in the horizontal disperser to prepare a mill base. After water was added to dilute the mill base to a pigment content of 5%, a 1% aqueous solution of acetic acid was added to lower the pH of the diluted mill base to 4.5. As a result, the viscosity of the diluted mill base increased and the resin was caused to precipitate, whereby a resin-treated pigment was obtained. The resin-treated pigment was then collected by filtration and thoroughly washed with water to obtain a pigment paste having a solid content of 26.4%.

As in Example 1, the pigment paste (75 parts), BDG (5.5 parts), deionized water (20.6 parts) and sodium hydroxide In the pigment dispersions that did not contain much organic solvent, the capsulation was maintained as the B block in the high-molecular dispersant according to the present invention were insoluble. Accordingly, good storage stability was obtained, so that those pigment dispersions were good. In the pigment dispersions that abundantly contained the organic solvent, on the other hand, the B blocks in the high-molecular dispersant-15 were not dissolved and the pigment dispersions retained stability despite the abundant inclusion of the solvent because the B blocks were high in molecular weight and low in solvent solubility. With the high-molecular dispersant-18, however, the dispersion turned out lacking in stability. Presumably, the B block in the high-molecular dispersant-18 had solvent solubility due to its composition despite its high molecular weight, and moreover, was soft because of the inclusion of 2EHMA units, and therefore, decapsulation took place to result in low stability.

Similar results were obtained when the high-molecular dispersants-16 and -17 were used in place of the high-molecular dispersant-15.

When dispersion was conducted as in Example 5 except for the use of the above-described copper phthalocyanine pigment in place of PR-122, similar results were also obtained so that a microparticulated pigment dispersion of high storage stability was obtained.

Example 6

Aqueous Yellow Pigment Dispersion-3

The high-molecular dispersant-19 (70.1 parts), BDG (28.8 parts) and water (513 parts) were mixed into a clear aqueous solution. When the solution was added to a powdery pigment of microparticulated PY-74 (average particle size: 97 nm; 200 parts), the powdery pigment was provided with fluidity. Stirring was then conducted in a dissolver. As in Example 1, the resulting mixture was dispersed together with the milling medium in the horizontal disperser to prepare a mill base. After water was added to dilute the mill base to a pigment content of 5%, a 1% aqueous solution of acetic acid was added to lower the pH of the diluted mill base to 4.5. As a result, the viscosity of the diluted mill base increased and the resin was caused to precipitate, whereby a resin-treated pigment was obtained. The resin-treated pigment was then collected by filtration and thoroughly washed with water to obtain a pigment paste having a solid content of 24.6%.

As in Example 1, the pigment paste (200 parts), BDG (8.9 parts), deionized water (44.6 parts) and sodium hydroxide (3.0 parts) were mixed, neutralized, converted into an aqueous solution, and then dispersed by the disperser. As the resulting pigment dispersion had a pigment content of 17%, water was added to the pigment dispersion to obtain a pigment dispersion having a pigment content of 14%. This pigment dispersion will be called an "aqueous yellow pigment dispersion-3".

Separately using the high-molecular dispersants-20 and -21 and the comparative high-molecular dispersant-2, dispersions were prepared. Those dispersions will be called aqueous yellow pigment dispersions-4, -5 and -6, respectively.

Those four aqueous yellow pigment dispersions were stored at 70° C. for 1 day and 7 days in a similar manner as described above. Changes in their particle sizes and viscosities are summarized in Table 12.

The resulting kneaded mixture (800 parts) was charged into water (2,000 parts), followed by stirring at high speed for 4 hours. Filtration and washing were then conducted to obtain a water-based paste of the red pigment (pigment content: 22.4%).

To the water-based paste (1,000 parts), an aqueous solution of potassium hydroxide (1.5 parts) and water (180.5 parts) was added, followed by dispersion in a medium-containing horizontal disperser as in Example 1. The particle size of the pigment in the dispersion and the viscosity of the dispersion were 110 nm and 3.12 mPa·s, respectively. When the dispersion was subjected to a similar storage test as described above, the particle size of the pigment and the viscosity of the dispersion were found to be 120 nm and 2.98 mPa·s, respectively, after stored at 70° C. for 1 week. Therefore, the dispersion was good in storage stability. This dispersion will be called an "aqueous red pigment dispersion-8".

Using the high-molecular dispersant-23, a water-based paste having a solid content of 24.9% was similarly obtained. Adding an aqueous solution of potassium hydroxide (1.06 parts) and water (317 parts) further, dispersion was conducted likewise. The average particle size was 115 nm, and the viscosity was 3.75 mPa·s. The thus-obtained dispersion will be called an "aqueous red pigment dispersion-9". When a similar stability test as described above was conducted, the particle size of the pigment and the viscosity of the dispersion were found to be 117 nm and 3.66 mPa·s, respectively, after stored at 70° C. for 1 week. Therefore, the dispersion was good in storage stability.

Using the high-molecular dispersant-24, a water-based paste having a solid content of 27.6% was also obtained

TABLE 12

| Aqueous yellow pigment dispersions | Particle size (nm) | | | | Change in viscosity (mPa · s) | | | |
| --- | --- | --- | --- | --- | --- | --- | --- | --- |
| | After dispersion | Day 1 | Day 7 | Evaluation | After dispersion | Day 1 | Day 7 | Evaluation |
| -3 | 112.1 | 113.9 | 112.7 | A | 4.83 | 4.73 | 4.71 | A |
| -4 | 105.2 | 106.9 | 107.5 | A | 4.98 | 4.87 | 4.62 | A |
| -5 | 109.0 | 107.6 | 108.6 | A | 5.59 | 5.41 | 4.99 | A |
| -6 | 104.8 | 190.2 | 301.0 | D | 5.42 | Gelled | Gelled | D |

It is commonly known that particles of a particulated azo pigment in a dispersion undergo crystal growth under heat. The comparative yellow pigment dispersion-6 was not equipped with dispersion stability and, when heat was applied, the azo pigment underwent crystal growth so that its particle size became larger. With the high-molecular dispersants-19-21 according to the present invention, however, the pigment particle sizes of the pigments surprisingly did not increase even when heat was applied, and therefore, the dispersions were good in stability. Presumably, the B blocks in the high-molecular dispersants-19 to −21 capsulated the associated pigments to inhibit crystal growth.

Example 7

Aqueous Red Pigment Dispersion-8

Using the above-described PR-122 as a dry powder pigment (100 parts), diethylene glycol (200 parts) and common salt (700 parts), kneading was conducted by a kneader to microparticulate the pigment as in Example 4. The high-molecular dispersant-22 (20.7 parts) was then added, followed by kneading such that the resulting kneaded mixture became fully homogeneous.

similarly. Adding an aqueous solution of potassium hydroxide (0.87 parts) and water (460 parts) further, dispersion was conducted likewise. The average particle size was 114 nm, and the viscosity was 3.81 mPa·s. The thus-obtained dispersion will be called an "aqueous red pigment dispersion-10". When a similar stability test as described above was conducted, the particle size of the pigment and the viscosity of the dispersion were found to be 111 nm and 3.45 mPa·s, respectively, after stored at 70° C. for 1 week. Therefore, the dispersion was good in storage stability.

Surprisingly, those dispersions were very good in storage stability although the overall acid values of the high-molecular dispersants were very small. Presumably, the capsulation by their B blocks as hydrophobic chains effectively acted, while their A blocks were dissolved in the aqueous medium.

Application Example 1

Application-1 to Water-Based Inkjet Inks

Using the aqueous blue pigment dispersion-1, aqueous yellow pigment dispersion-1, aqueous red pigment dispersion-1 and aqueous black pigment dispersion-1 obtained in Example 1, water-based inkjet inks were prepared in accordance with the following formula.

| | |
|---|---|
| Aqueous pigment dispersion | 100 parts |
| Water | 275 parts |
| 1,2-Hexanediol | 40 parts |
| Glycerin | 80 parts |
| "SURFINOL 465" (product of Air Products Inc.) | 5 parts |

Those inks were subjected to centrifugation (8,000 rpm, 20 minutes) to remove coarse particles, and were then filtered through a 5-μm membrane filter to obtain the inks of the respective colors. Those inks were separately filled in ink cartridges, and by an inkjet printer, solid printing was performed on inkjet glossy paper "PHOTOLIKE QP" (product of Konica Minolta Business Technologies, Inc.). After the prints were left over for one day in a room, they were measured for 20° gloss by using "MICRO-TRI-GLOSS" (manufactured by BYK-Chemie GmbH). Further, vertical and horizontal lines were printed, and their print definitions were visually observed to evaluate them for print quality. As scratch resistance on glossy paper, the printed surfaces were rubbed with a finger to confirm whether or not the gloss was lowered. The results of these tests are summarized in Table 13.

TABLE 13

| | | Inks of Application Example 1 | | | |
|---|---|---|---|---|---|
| | | Cyan color | Magenta color | Yellow color | Black color |
| Print quality | Print definition | A | A | A | A |
| | 20° gloss when printed on glossy paper | 47 | 54 | 78 | 76 |
| | Scratch resistance on glossy paper | A | A | A | A |

Evaluation of Print Definition
    A: No misalignment
    B: Substantially no misalignment
    C: Misalignment occurred
Evaluation of Scratch Resistance
    A: No separation
    B: Slightly separated
    C: Color separated on printed surface As described above, the A blocks of the high-molecular dispersants acted as binder components, thereby making it possible to obtain prints which were very high in the gloss of printed lines, were free of misalignment, and were good in scratch resistance.

When the aqueous blue pigment dispersion-2, aqueous yellow pigment dispersions-2, -3 and -4, and aqueous red pigment dispersions-2, -4 and -6 obtained in the examples were used likewise, similar results were also obtained. Those pigment dispersions gave high gloss and high printability.

Application Example 2

Application-2 to Water-Based Inkjet Inks

Using the aqueous blue pigment dispersion-2, aqueous yellow pigment dispersion-2, aqueous red pigment dispersion-3 and aqueous black pigment dispersion-2 obtained in Example 2, inks of the respective colors were obtained in accordance with a similar formula and processing as in Application Example 1. Those inks were separately filled in ink cartridges, and by an inkjet printer, gradation printing was performed on plain paper (product of Fuji Xerox Co., Ltd.). After the prints were left over for one day in a room, they were measured for optical density by using "MACBETH RD-914" (manufactured by Gretag MacBeth GmbH). As scratch resistance, the printed surfaces were rubbed with a finger to confirm whether or not the colors on the printed surfaces were separated. The results of these tests are summarized in Table 14.

TABLE 14

| | Inks of Application Example 2 | | | |
|---|---|---|---|---|
| | Cyan color | Magenta color | Yellow color | Black color |
| Optical density when printed at 100% on plain paper | 1.38 | 1.42 | 1.45 | 1.43 |
| Scratch resistance on glossy paper | B | B | B | B |

Figure 4:
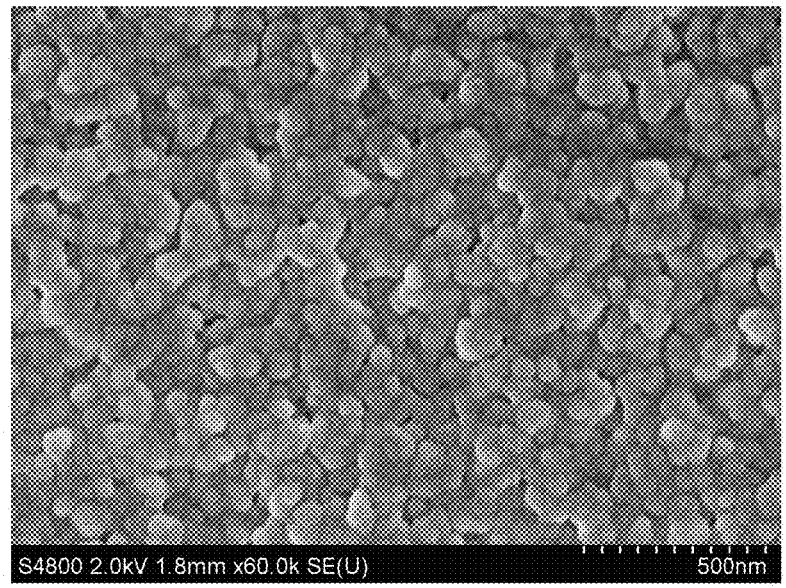
FIG. 4 shows printed pigment particles.

Evaluation of Scratch Resistance
    A: No separation
    B: Slightly separated
    C: Separated With the inks of Application Example 2, it was confirmed that high-density printing was feasible to give very high color-developing ability although the printed lines were low in scratch resistance due to the inclusion of no binder component. An electron micrograph of pigment particles on the paper printed with the aqueous blue pigment dispersion-2 is shown in FIG. 4. Bare pigment particles such as being exposed at edges thereof are not observed, and the pigment is observed to be soft at surfaces thereof. The pigment has, therefore, been confirmed to be coated with the high-molecular dispersant.

Prints of highly-developed color density were also obtained when the aqueous red pigment dispersions-8 to -10 of the example were used likewise.

Application Example 3

Application to Water-Based Stationery

Using the aqueous blue pigment dispersion-1, aqueous yellow pigment dispersion-2, aqueous red pigment dispersion-3, aqueous black pigment dispersions-1 and -2, and aqueous green pigment dispersion-1 obtained in the examples, water-based stationery pigment inks were prepared in accordance with the following formula.

| | |
|---|---|
| Aqueous pigment dispersion | 100 parts |
| Water | 46.7 parts |
| Ethylene glycol | 11.1 parts |
| Glycerin | 40.0 parts |
| Thiourea | 24.4 parts |

Those mixtures were separately stirred for 30 minutes in a disper mixer, and were then subjected to centrifugal separation (8,000 rpm, 20 minutes) to remove coarse particles. Subsequently, the resultant mixtures were filtered through a 5-μm membrane filter to obtain inks of the respective colors. Those inks were filled in felt-tip pens made of plastics and having cores and pen points formed by a plastic forming process, and were then tested.

Using those felt-tip pens, writing was performed on plain paper. The strike-out phenomenon that an ink penetrates to the back side of paper was not observed, and the writing was feasible with sharpness. When the felt-tip pens were uncapped and left over at room temperature for 24 hours, the pen points became dry so that no writing was feasible. Once those dried pen points were brought into contact with water, however, it became possible to write again. Presumably, the inks were good in re-dispersibility, thereby making it possible to write again. With the inks of the respective colors, it was possible to obtain these results in common.

Application Example 4

Application to Water-Based Paint

To the aqueous white pigment dispersion (100 parts) obtained in Example 3, an aqueous styrene-acrylic resin emulsion (solid content 40%, a styrene-acrylic acid-α-methylstyrene copolymer neutralized with ammonia, acid value: 120 mgKOH/g; 50 parts) was added, followed by thorough stirring into a homogeneous mixture in a disper mixer. The mixture was adjusted to pH 8 with aqueous ammonia. A nylon film of 20 μm thickness was subjected to corona discharge treatment, and by a No. 4 bar coater, was then coated with the white printing ink obtained as described above. After drying, the coated nylon film was aged at 80° C. for 1 hour. An adhesive strength test of the printed ink layer was then conducted by using a cellophane tape. As a result, the ink layer showed good adhesiveness without separation.

INDUSTRIAL APPLICABILITY

The aqueous pigment dispersion according to the present invention has high storage stability and dispersion stability and good post-drying re-dispersibility, offers good print quality, and provides colored products or articles with high added value.

The invention claimed is:

1. A process for producing a block polymer of a diblock polymer of A-B or a triblock polymer of A-B-C,
said process comprising a living radical polymerization process comprising;
    forming a catalyst radical in a catalyst by reacting a free, radical RPI generated from a radical polymerization initiator with the catalyst;
    reacting the catalyst radical with a polymerization initiating compound having an organic iodide, so that the catalyst radical extracts an iodine atom from the polymerization initiating compound and generates a radical PIC in the polymerization initiating compound; and
    reacting an addition-polymerizable monomer with the radical PIC in the polymerization initiating compound,
wherein the catalyst is selected from the group consisting of an iodine-containing phosphorus halide, a phosphite compound, a phosphinate compound, an imide compound, a phenolic compound, an iodoxyphenyl compound, a hydantoin compound, and a vitamin,
wherein each of A, B, and C represents a polymer block formed of at least one addition-polymerizable monomer,
wherein each of the polymer block A and the polymer block C is a polymer block formed by polymerizing at least one addition-polymerizable monomer having an acid group as at least one component in each of the polymer block A and the polymer block C, and the polymer block A and the polymer block C have an acid value in a range from 40 to 300 mgKOH/g,
the polymer block A and the polymer block C are same or different, and
the polymer block B is a water-insoluble polymer block and is formed of the at least one addition-polymerizable monomer that comprises a hydrophobic addition-polymerizable monomer in an amount of 50 wt % or more relative to the polymer block B.

2. The process according to claim 1, wherein, the process further comprises a step of adding and polymerizing the addition-polymerizable monomer for forming a next block in the block polymer,
wherein the step of adding and polymerizing the addition-polymerizable monomer for forming the next block is performed at a time point when a polymerization degree of the addition-polymerizable monomer forming the polymer block A has reached 50% or higher, or at a time point when a polymerization degree of the addition-polymerizable monomer forming the polymer block B has reached 50% or higher.

3. The process according to claim 2, wherein, in the case of the triblock polymer, the process further comprises a step of adding and polymerizing the addition-polymerizable monomer for forming the polymer block C,
wherein the step of adding and polymerizing the addition-polymerizable monomer for forming the polymer block C is performed at a time point when a polymerization degree of the addition-polymerizable monomer forming the polymer block B has reached 80% or higher.

4. The process according to claim 1, wherein the acid group is a carboxyl group, a sulfonic group, or a phosphoric group.

5. The process according to claim 4, wherein the addition-polymerizable monomer having the acid group is (meth)acrylic acid.

6. The process according to claim 1, wherein the hydrophobic addition-polymerizable monomer is (meth)acrylate having at least one group selected from the group consisting of aliphatic alkyl group, aromatic alkyl group, and alicyclic alkyl group.

7. The process according to claim 6, wherein the hydrophobic addition-polymerizable monomer is benzyl(meth)acrylate or cyclohexyl(meth)acrylate.

* * * * *